US012764357B2

(12) United States Patent
Syed et al.

(10) Patent No.: US 12,764,357 B2
(45) **Date of Patent: *Oct. 13, 2026**

(54) MEDIA CONTENT ENHANCEMENT BASED ON CONTENT IMPORTANCE

(71) Applicant: Comcast Cable Communications, LLC, Philadelphia, PA (US)

(72) Inventors: Yasser F. Syed, La Crescenta, CA (US); Patrick Ladd, San Marcos, CA (US); Derik Yarnell, Montrose, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,500

(22) Filed: Jun. 10, 2024

(65) Prior Publication Data

US 2024/0333987 A1 Oct. 3, 2024

Related U.S. Application Data

(63) Continuation of application No. 17/670,680, filed on Feb. 14, 2022, now Pat. No. 12,052,449, which is a
(Continued)

(51) Int. Cl.
*H04N 21/235* (2011.01)
*H04N 21/2662* (2011.01)

(52) U.S. Cl.
CPC ..... *H04N 21/2353* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 9,591,257 | B2 | 3/2017 | Oh et al. |
| 10,904,309 | B1 | 1/2021 | Au et al. |

(Continued)

FOREIGN PATENT DOCUMENTS

| | | | |
|---|---|---|---|
| EP | 2111035 | A1 | 10/2009 |
| EP | 2830318 | A1 | 1/2015 |

(Continued)

OTHER PUBLICATIONS

Francois and de Kerkhof, A Single-Layer Hdr Video Coding Framework With SDR Compatibility, 2016.

(Continued)

*Primary Examiner* — Omar S Parra
(74) *Attorney, Agent, or Firm* — Banner & Witcoff, Ltd.

(57) ABSTRACT

Methods, systems, and computing devices are described herein for request and transmission, to a computing device, of media content based on the importance of a portion of the media content. Media content may comprise baseline media content and enhancement data. Based on determining that an importance of a portion of the media content meets a threshold, the computing device may receive the enhancement data. The computing device may receive the enhancement data via a separate interface than the baseline media content. Information about baseline media content, enhancement data, and the importance of a portion of the media content may be contained in a manifest. The threshold for importance may be based on the media content, the enhancement data, an interface to be used, and/or user preferences.

36 Claims, 8 Drawing Sheets

Related U.S. Application Data continuation of application No. 16/058,514, filed on Aug. 8, 2018, now Pat. No. 11,284,134.

(56) References Cited

U.S. PATENT DOCUMENTS

| | | | | |
|---|---|---|---|---|
| 2003/0195977 | A1 * | 10/2003 | Liu | H04L 65/1101 375/E7.181 |
| 2008/0068446 | A1 * | 3/2008 | Barkley | H04N 19/187 348/14.07 |
| 2010/0185973 | A1 | 7/2010 | Ali et al. | |
| 2012/0079062 | A1 | 3/2012 | Fonseca, Jr. et al. | |
| 2012/0143678 | A1 | 6/2012 | Sathyanath et al. | |
| 2012/0197419 | A1 * | 8/2012 | Dhruv | H04N 21/26258 700/94 |
| 2013/0083838 | A1 | 4/2013 | Touze et al. | |
| 2013/0136416 | A1 | 5/2013 | Sathish et al. | |
| 2015/0208102 | A1 | 7/2015 | Takahashi et al. | |
| 2016/0134868 | A1 * | 5/2016 | He | H04N 19/136 375/240.02 |
| 2016/0173811 | A1 | 6/2016 | Oh et al. | |
| 2016/0191929 | A1 | 6/2016 | Hwang et al. | |
| 2016/0234536 | A1 | 8/2016 | Stockhammer et al. | |
| 2016/0301959 | A1 | 10/2016 | Oh et al. | |
| 2018/0091766 | A1 | 3/2018 | Mobasher et al. | |
| 2018/0295400 | A1 * | 10/2018 | Thomas | H04N 21/234327 |
| 2019/0045194 | A1 | 2/2019 | Zavesky et al. | |
| 2020/0045384 | A1 * | 2/2020 | Nilsson | H04N 21/84 |
| 2020/0267429 | A1 * | 8/2020 | He | H04N 21/8456 |

FOREIGN PATENT DOCUMENTS

| | | | |
|---|---|---|---|
| EP | 2947560 | A1 | 11/2015 |
| EP | 3043553 | A1 | 7/2016 |
| EP | 3089464 | A1 | 11/2016 |
| WO | 2009064067 | A1 | 5/2009 |
| WO | 2013/046095 | A1 | 4/2013 |
| WO | 2016/136470 | A1 | 9/2016 |
| WO | 2016/178549 | A1 | 11/2016 |
| WO | 2017100769 | A1 | 6/2017 |

OTHER PUBLICATIONS

Oct. 25, 2019—European Partial Search Report—EP 19190793.0.
Feb. 5, 2020—European Extended Search Report—EP 19190793.0.
Feb. 17, 2021—European Office Action—EP 19190793.0.
Nov. 8, 2022—EP Office Action—EP App No. 19190793.0.

* cited by examiner

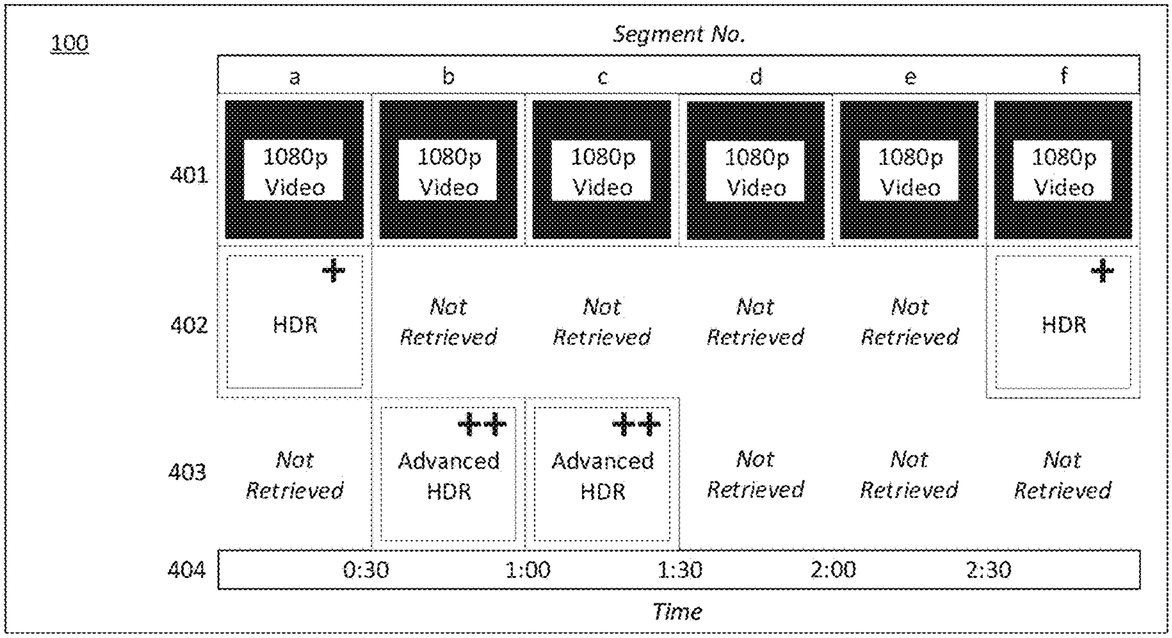

Interface Requirements

| | | a | b | c | d | e | f |
|---|---|---|---|---|---|---|---|
| 405 | **Scene Complexity** | Moderate | High | High | Low | Low | Moderate |
| 406 | **Scene Subjective Importance** | Moderate | High | High | Low | Low | Moderate |
| 407 | **Minimum Bandwidth Required** | 30 Mbps | 45 Mbps | 47 Mbps | 23 Mbps | 25 Mbps | 20 Mbps |
| 408 | **Tolerance for Latency Delays** | High | High | High | High | High | Low |
| 409 | **Current Network Congestion** | Low | High | High | Low | Low | High |
| | **Selected Interface** | | | | | | |
| 410 | **For Baseline Media Content** | HDMI | HDMI | HDMI | HDMI | HDMI | HDMI, Ethernet |
| 412 | **For Enhancement Data** | Ethernet | Ethernet, LTE | Ethernet, LTE | N/A | N/A | HDMI, Ethernet |

Fig. 4

| | Interface Requirement Condition | | | | Resulting Interface Selection | |
|---|---|---|---|---|---|---|
| | Network Latency | Scene Importance | Subscription Level | Bandwidth Requirement | Low-Bandwidth WiFi | High-Bandwidth LTE |
| 501 | Low | High | High | High | Don't Use | Use |
| 502 | Low | High | High | Low | Don't Use | Use |
| 503 | Low | High | Low | High | Use | Don't Use |
| 504 | Low | High | Low | Low | Use | Don't Use |
| 505 | Low | Low | High | High | Don't Use | Use |
| 506 | Low | Low | High | Low | Use | Don't Use |
| 507 | Low | Low | Low | High | Use | Don't Use |
| 508 | Low | Low | Low | Low | Use | Don't Use |
| 509 | High | High | High | High | Use | Use |
| 510 | High | High | High | Low | Use | Use |
| 511 | High | High | Low | High | Use | Use |
| 512 | High | High | Low | Low | Use | Don't Use |
| 513 | High | Low | High | High | Use | Use |
| 514 | High | Low | High | Low | Use | Use |
| 515 | High | Low | Low | High | Use | Don't Use |
| 516 | High | Low | Low | Low | Use | Don't Use |

Fig. 5

```
<metadata>
     <subscriberlimit subscriber='all'>
     <timespacing t='30s'>
</metadata>
<mediacontent>
     <set type='video' res='1080' fr='30' level='all'>
          <mediacontent id='1' rank='4' size='4MB'>
          <mediacontent id='2' rank='3' size='3MB'>
          <mediacontent id='3' rank='1' size='1MB'>
          <mediacontent id='4' rank='4' size='4MB'>
          <mediacontent id='5' rank='3' size='3MB'>
          <mediacontent id='6' rank='1' size='1MB'>
     </set>
     <set type='video' res='4K' fr='60' level='premium'>
          <mediacontent id='1' rank='5' size='40MB'>
          <mediacontent id='2' rank='4' size='30MB'>
          <mediacontent id='3' rank='2' size='10MB'>
          <mediacontent id='4' rank='5' size='40MB'>
          <mediacontent id='5' rank='4' size='30MB'>
          <mediacontent id='6' rank='2' size='10MB'>
     </set>
     <set type='hdr' level='all'>
          <enhancementdata id='1' rank='3' size='3MB'>
          <enhancementdata id='2' rank='5' size='10MB'>
          <enhancementdata id='3' rank='3' size='5MB'>
          <enhancementdata id='4' rank='3' size='3MB'>
          <enhancementdata id='5' rank='5' size='10MB'>
          <enhancementdata id='6' rank='3' size='5MB'>
     </set>
     <set type='hdr10' level='premium' limit='4K'>
          <enhancementdata id='1' rank='2' size='30MB'>
          <enhancementdata id='2' rank='5' size='100MB'>
          <enhancementdata id='3' rank='2' size='50MB'>
          <enhancementdata id='4' rank='2' size='30MB'>
          <enhancementdata id='5' rank='5' size='100MB'>
          <enhancementdata id='6' rank='2' size='50MB'>
     </set>
</mediacontent>
```

Fig. 6

MEDIA CONTENT ENHANCEMENT BASED ON CONTENT IMPORTANCE

CROSS-REFERENCE TO RELATED APPLICATIONS

This application is a continuation of and claims priority to U.S. patent application Ser. No. 17/670,680, filed Feb. 14, 2022, which is a continuation of U.S. patent application Ser. No. 16/058,514, filed Aug. 8, 2018 (now U.S. Pat. No. 11,284,134), each of which is hereby incorporated by reference in its entirety.

BACKGROUND

Improvements in video quality, including resolution, dynamic range, refresh rate, and color gamut, have increased bandwidth requirements for media content. Many devices have limited interface bandwidth, impeding their ability to receive and display such media content.

SUMMARY

The following presents a simplified summary of certain features. This summary is not an extensive overview, and is not intended to identify key or critical elements. The following summary merely introduces certain features in a simplified form as a prelude to the more detailed description.

A content device may have access to multiple versions of a piece of content and multiple sets of enhancement data for that content, may have multiple communication interfaces available for delivery of the content and enhancement files, and may dynamically determine a desired combination of content quality and interface use for retrieval of the content and enhancement files. A computing device may be configured to cause the display of all or a part of media content from one or more sources. In response to a receipt of a user request for media content, the computing device may determine information pertaining to the media content. Such information may include one or more sets of baseline media content, which may comprise forms of the media content available in different resolutions or aspect ratios. Such information may further include the availability and size of sets of enhancement data, which may be any information which may be used to improve the video and/or audio content of the baseline media content. The computing device may determine one or more interfaces over which such enhancement data may be received. Based on the available baseline media content, enhancement data, interfaces, the importance of the media content, and/or other considerations, the computing device may select baseline media content, one or more sets of enhancement data, and/or one or more interfaces over which to receive the baseline media content and/or enhancement data. The computing device may receive and cause display of the baseline media content and one or more sets of enhancement data. Different interfaces, baseline media content, and/or enhancement data may be selected for different portions of media content based on, for example, the importance of a portion of the media content, network conditions, user accounts, transmission costs, or other such considerations.

These and other features and advantages are described in greater detail below.

BRIEF DESCRIPTION OF THE DRAWINGS

The present disclosure includes examples shown in, but is not limited by, the accompanying drawing in which like numerals indicate similar elements.

FIG. 4 shows an example of media content received by computing device in response to steps taken by computing device.

FIG. 5 is a truth table for an example computing device, which decides whether to use one or both of a WiFi connection and an LTE connection.

FIG. 6 shows an example XML manifest, which may be stored by content source.

DETAILED DESCRIPTION

In the following description, reference is made to the accompanying drawings, which form a part hereof, and in which are shown examples of various features. It is to be understood that other features may be utilized and structural and functional modifications may be made, without departing from the scope of the present disclosure.

Figure 1:
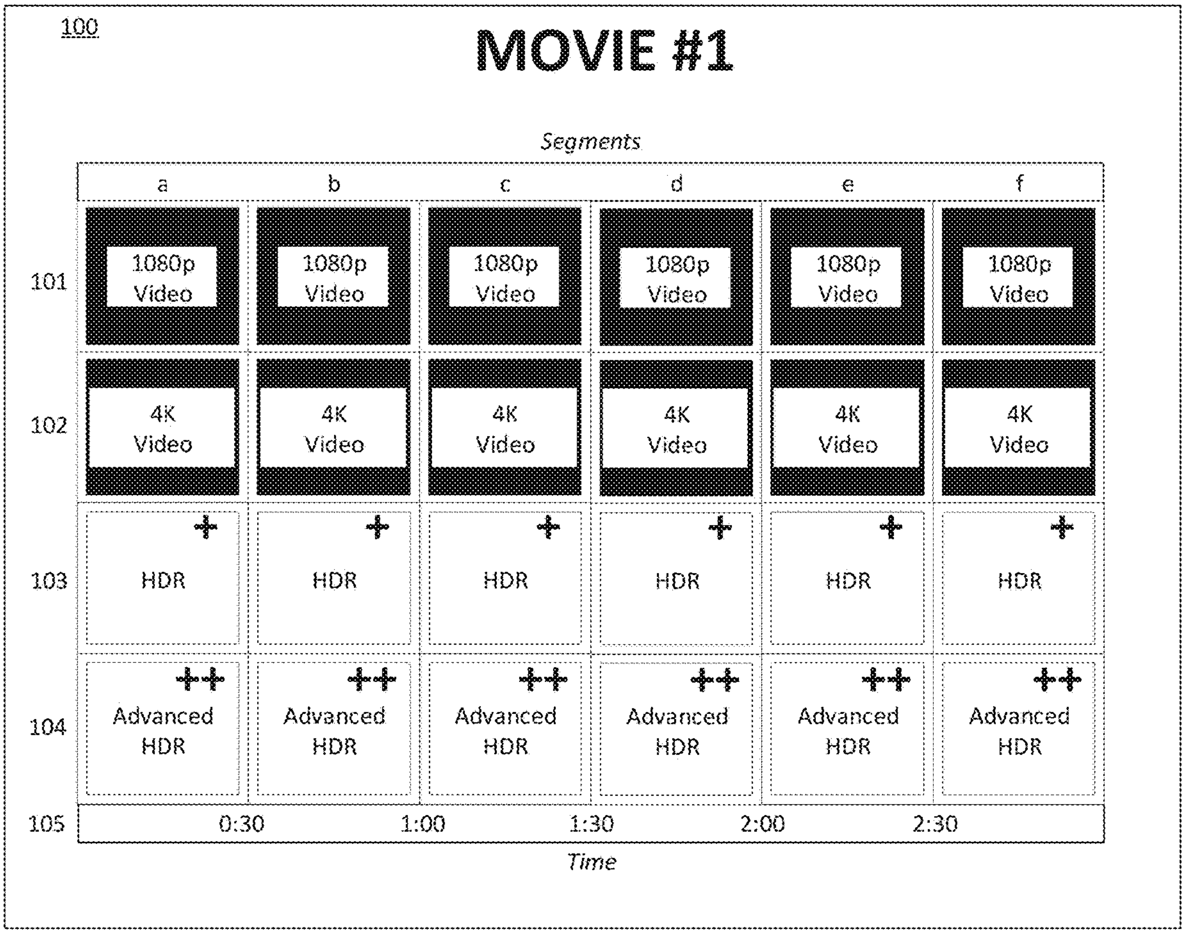
FIG. 1 is an example of media content comprising basic baseline media content, advanced baseline media content, basic enhancement data, and advanced enhancement data.

FIG. 1 depicts various files that may be available to provide a media content 100, such as a movie. Row 101 corresponds to a basic baseline version (e.g., a 1080p video file), and row 102 corresponds to an advanced baseline version (e.g., a 4K video file), of a media file. Row 103 corresponds to basic enhancement data, and row 104 corresponds to advanced enhancement data, for the media file. Though terms such as "basic" and "enhanced" are used, such versions and data need not be a specific format or style: for example, "advanced" enhancement data may be configured to optimize High Dynamic Range ("HDR") content for older television sets. Each column of FIG. 1 may correspond to a thirty section portion of the media content 100. In FIG. 1, row and column identifiers are used together to identify a specific box in FIG. 1: for example, "101*a*" refers to the 1080p video file depicted in row 101 and column a.

As shown in FIG. 1, for each thirty-second segment of a movie, there may be a file (e.g., box 101*a*) containing that segment in a basic baseline version (e.g., a 1080p video file), and another file (e.g., box 102*a*) containing that segment in an advanced baseline version (e.g., a 4K video file). For each thirty-second segment of the movie, there may also be a file (e.g., box 103*a*) having enhancement data (e.g., HDR data) which could enhance a baseline version of media content 100 (e.g., boxes 101*a* or 102*a*), and a file (e.g., box 104*a*) having advanced enhancement data (e.g., HDR10 Media Profile ("HDR10") data) which would enhance a baseline version of media content 100 (e.g., boxes 101*a* or 102*a*).

FIG. 1 depicts four rows and six columns. The first row comprises basic baseline media content 101*a*-101*f*, representing 1080p video files. The second row comprises advanced baseline media content 102*a*-102*f*, representing 4K video files. The third row comprises basic enhancement data 103*a*-103*f*, representing HDR enhancement data. The fourth row comprises advanced enhancement data 104*a*-104*f*, representing Advanced HDR enhancement data. Baseline media content refers to both the basic baseline media content 101*a*-101*f* and the advanced baseline media content 102*a*-102*f*, and enhancement data refers to both the basic enhancement data 103*a*-103*f* and the advanced enhancement data 104*a*-104*f*. FIG. 1 depicts two sets of the baseline media content 101*a*-101*f*, 102*a*-102*f* and the enhancement data 103*a*-103*f*, 104*a*-104*f*; however, any number of baseline media content and/or enhancement data may exist.

The baseline media content 101*a*-101*f*, 102*a*-102*f* may be a video program requested by the user, a video on demand ("VOD") offering, a movie, a television program, an advertisement within a video program (e.g., a commercial appearing in a multicast presentation of a television program), or any other form of video and/or audio content. The video content may include an audio portion and/or other supplemental information. The baseline media content 101*a*-101*f*, 102*a*-102*f* may be received via a transmission medium. The transmission medium may be any appropriate medium for sending and receiving the baseline media content 101*a*-101*f*, 102*a*-102*f*, such as a fiber optic interface, a coaxial cable, IEEE 802.16 WiMax, a satellite connection, and/or a similar interface. The baseline media content 101*a*-101*f*, 102*a*-102*f* may further be sent according to one or more broadcast standards, including the set of ATSC (Advance Television Systems Committee) standards, DVB (Digital Video Broadcasting) standards, and/or other standards.

The baseline media content 101*a*-101*f*, 102*a*-102*f* may comprise a low quality form of the media content 100. There may be a plurality of different forms of the baseline media content 101*a*-101*f*, 102*a*-102*f*. For example, the basic baseline media content 101*a*-101*f* may represent 1080p video files, whereas the advanced baseline media content 102*a*-102*f* may represent 4K video files. As such, the baseline media content 101*a*-101*f*, 102*a*-102*f* may be low quality because, for example, it lacks additional bit depth and/or post-processing. The baseline media content 101*a*-101*f*, 102*a*-102*f* and the enhancement data 103*a*-103*f*, 104*a*-104*f* may be one or a plurality of packets, data files, or any other data structure. Different sets of the baseline media content 101*a*-101*f*, 102*a*-102*f* may have may have different network condition requirements, transmission requirements, processing requirements, and/or other requirements. Different sets of the baseline media content 101*a*-101*f*, 102*a*-102*f* may also portray the media content 100 in different ways: for example, the basic baseline media content 101*a*-101*f* may be formatted at a limited aspect ratio showing only a portion of a movie scene, whereas the advanced baseline media content 102*a*-102*f* may be formatted at an aspect ratio that shows the entire movie scene. The baseline media content 101*a*-101*f*, 102*a*-102*f* may be formatted based on, among other things, the properties of a computing device requesting the baseline media content 101*a*-101*f*. A server on a content delivery network may repackage the baseline media content 101*a*-101*f* based on the capabilities of the device requesting the media content 100. FIG. 1 depicts two sets of the baseline media content 101*a*-101*f*, 102*a*-102*f*, but any number of sets of the baseline media content 101*a*-101*f*, 102*a*-102*f* may exist.

The enhancement data 103*a*-103*f*, 104*a*-104*f* may be any information associated with the improvement or modification of the baseline media content 101*a*-101*f*, 102*a*-102*f*. The enhancement data 103*a*-103*f*, 104*a*-104*f* may contain information pertaining to dynamic range, color gamut, refresh rate, resolution, saturation, brightness, gain, treble, bass, and/or any other aspect of the baseline media content 101*a*-101*f*, 102*a*-102*f*. The enhancement data may be used by a computing device to improve the baseline media content by, for example, modifying data of the baseline media content itself, optimizing a display device for the baseline media content, or scaling or otherwise processing the baseline media content. For example, the enhancement data 103*a*-103*f*, 104*a*-104*f* may be Supplemental Enhancement Information ("SEI") messages as described by the H.264 standard. The enhancement data 103*a*-103*f*, 104*a*-104*f* may also be formatted according to a variety of video formats, including but not limited to various HDR standards such as HDR10, DOLBY VISION™, HLG, and Advanced HDR. The enhancement data 103*a*-103*f*, 104*a*-104*f* may be information which may be used to process the baseline media content 101*a*-101*f*, 102*a*-102*f*, and/or may itself require processing (e.g., decompressing) before being used to process the baseline media content 101*a*-101*f*, 102*a*-102*f*. The enhancement data may comprise an enhancement layer: for example, the enhancement data 103*a*-103*f* may comprise a scaling enhancement layer and HDR enhancement data, whereas the enhancement data 104*a*-104*f* may be only HDR enhancement data.

An example of how the enhancement data 103*a*-103*f* may improve the baseline media content 101*a*-101*f* is provided herein. The basic baseline media content 101*a*-101*f* may be, for example, 1080p video with a bit depth of 8 bits per sample. The basic enhancement data 103*a*-103*f* may comprise per-pixel data at 10 bits per sample. While the basic baseline media content 101*a*-101*f* may be played alone and displayed at 8 bits per sample, a computing device may apply the basic enhancement data 103*a*-103*f* to the basic baseline media content 101*a*-101*f* such that formerly 8 bits per sample video is processed into 10 bits per sample video. Application of the basic enhancement data 103*a*-103*f* to the basic baseline media content 101*a*-101*f* (e.g., application of the basic enhancement data 103*a* to the basic baseline media content 101*a*) may be based on a sequence number, UTC time, segment duration, or other appropriate information. This separation of the baseline media content 101*a*-101*f* and the enhancement data 103*a*-103*f* means that computing devices without the ability to process 10 bits per sample video need only retrieve the basic baseline media content 101*a*-101*f*, whereas computing devices that are capable of processing 10 bits per sample video need only additionally retrieve the basic enhancement data 103*a*-103*f*.

A simplified example of the division of the baseline media content 101*a*-101*f*, 102*a*-102*f* and the enhancement data 103*a*-103*f*, 104*a*-104*f* is provided herein. The baseline media content 101*a*-101*f*, 102*a*-102*f* may be H.264 video (e.g., Video Coding Layer ("VCL") content in the Network Abstraction Layer ("NAL")), and the enhancement data 103*a*-103*f*, 104*a*-104*f* may be Supplemental Enhancement Information ("SEI") associated with the H.264 video (e.g., non-VCL content in the NAL). The basic baseline media content 101*a*-101*f* may be 1080p H.264 video, whereas the advanced baseline media content 102*a*-102*f* may be 4K H.264 video. The basic enhancement data 103*a*-103*f* may be HDR data, whereas the advanced enhancement data 104*a*-104*f* may be HDR10 data. A television which supports 4K video playback and one form of HDR, but not another form of HDR, may thereby retrieve the basic enhancement data 103*a*-103*f* corresponding to the supported form of HDR, and need not retrieve other data which it is incapable of using.

The enhancement data 103*a*-103*f*, 104*a*-104*f* may additionally or alternatively be used to modify the baseline media content 101*a*-101*f*, 102*a*-102*f* by, for example, adding additional video content, resolution, or other similar improvements or modifications. For example, the basic baseline media content 101*a*-101*f* may comprise 1080p video, and the advanced enhancement data 104*a*-104*f* may comprise interstitial pixel data which, when processed by a computing device, turns the 1080p video into 4K video. The enhancement data 103*a*-103*f*, 104*a*-104*f* may, in circumstances such as that example, have a larger file size (and therefore require more bandwidth for transmission) than the baseline media content 101*a*-101*f*, 102*a*-102*f*. As another example, the basic baseline media content 101*a*-101*f* may comprise a 1080p video of a news feed, and the basic enhancement data 103*a*-103*f* may comprise video data for a news ticker to be appended on top of the baseline media content 101*a*-101*f*. As yet another example, the basic baseline media content 101*a*-101*f* may comprise a video with a 4:3 aspect ratio, and the basic enhancement data 103*a*-103*f* may comprise video data to be appended to the left and right of the basic baseline media content 101*a*-101*f* to transform the 4:3 aspect ratio to a 16:9 aspect ratio. The enhancement data 103*a*-103*f*, 104*a*-104*f* may, in circumstances such as those examples, be video data.

Multiple forms of the enhancement data 103*a*-103*f*, 104*a*-104*f* may be available. For example, the basic enhancement data 103*a*-103*f* may comprise a basic form of HDR information, whereas the advanced enhancement data 104*a*-104*f* may contain more advanced forms of HDR information, such HDR10. The basic enhancement data 103*a*-103*f* and the advanced enhancement data 104*a*-104*f* may have different network condition requirements, transmission requirements, processing requirements, and/or other similar requirements. For example, the advanced HDR enhancement data 104*a*-104*f* may have a significantly larger file size and thus require significantly more bandwidth than the basic enhancement data 103*a*-103*f*. FIG. 1 depicts two sets of the enhancement data 103*a*-103*f*, 104*a*-104*f*, but any number of sets of the enhancement data 103*a*-103*f*, 104*a*-104*f* may exist.

The baseline media content 101*a*-101*f*, 102*a*-102*f* and the enhancement data 103*a*-103*f*, 104*a*-104*f* may be divided into one or more sets corresponding to, for example, a video resolution, a form of HDR, or other similar categories. Boxes 101*a*-101*f* of FIG. 1 comprise a set of basic baseline media content, such as a series of thirty-second 1080p video files, whereas boxes 102*a*-102*f* of FIG. 1 comprise a set of advanced baseline media content, such as a series of thirty-second 4K video files. Similarly, 103*a*-103*f* comprise a set of basic enhancement data, such as a series of HDR files, whereas 104*a*-104*f* comprise a set of advanced enhancement data, such as a series of HDR10 files. Accordingly, sets of the baseline media content 101*a*-101*f*, 102*a*-102*f* may be grouped based on, for example, resolution or framerate, whereas sets of the enhancement data 103*a*-103*f*, 104*a*-104*f* may be grouped based on, for example, HDR formats or color gamut. Sets may share data: there may be no visible difference between the basic baseline media content 101*c* and the advanced baseline media content 102*c* such that the same data may be delivered for both. A computing device may switch between one or more sets during playback of the media content 100. As such, sets may merely be used to logically collect similar formats of the baseline media content 101*a*-101*f*, 102*a*-102*f* and the enhancement data 103*a*-103*f*, 104*a*-104*f*.

Sets of the baseline media content 101*a*-101*f*, 102*a*-102*f* and enhancement data 103*a*-103*f*, 104*a*-104*f* may be subdivided. The baseline media content 101*a*-101*f*, 102*a*-102*f*, and the enhancement data 103*a*-103*f*, 104*a*-104*f* may be divided on a timeline 105 based on time increments (e.g., thirty second time increments) or based on the method of video compression (e.g., MPEG Group of Pictures I frames). FIG. 1 shows example baseline media content 101*a*-101*f*, 102*a*-102*f* and enhancement data 103*a*-103*f*, 104*a*-104*f* subdivided into six segments (a-f) of thirty seconds each such that each subdivision (column) and each set (row) corresponds to a different file. The baseline media content 101*a*-101*f*, 102*a*-102*f* and the enhancement data 103*a*-103*f*, 104*a*-104*f* may be associated by timing or other synchronization data. For example, the baseline media content 101*a*-101*f*, 102*a*-102*f* and the enhancement data 103*a*-103*f*, 104*a*-104*f* may be associated by a sequence number, UTC time, segment duration, or any other desired indication of the sequence of files.

Though FIG. 1 depicts the baseline media content 101*a*-101*f*, 102*a*-102*f* and the enhancement data 103*a*-103*f*, 104*a*-104*f* as a series of files corresponding to thirty seconds each, the baseline media content 101*a*-101*f*, 102*a*-102*f* and/or the enhancement data 103*a*-103*f*, 104*a*-104*f* may be streaming content. For example, the basic baseline media content 101*a*-101*f* may be a video stream received over the air via an antenna, but the basic enhancement data 103*a*-103*f* corresponding to the basic baseline media content may be downloaded as a series of files. A computing device may associate the basic baseline media content to the received video stream based on time or other synchronization data. This may allow, for example, a content provider to stream a sports event over a streaming interface (e.g., over the air, to be received via an antenna) while still offering the enhancement data 103*a*-103*f*, 104*a*-104*f* for the sports event.

The baseline media content 101*a*-101*f*, 102*a*-102*f* and/or the enhancement data 103*a*-103*f*, 104*a*-104*f* may be part of a media content stream. The baseline media content 101*a*-101*f* may, for example, comprise a stream of a live sports event, whereas the enhancement data 103*a*-103*f* may provide information associated with the improvement of the stream. The baseline media content 101*a*-101*f*, 102*a*-102*f* and the enhancement data 103*a*-103*f*, 104*a*-104*f* may additionally or alternatively be part of a transmission medium or encrypted.

The media content 100 may have one or more sets of the baseline media content 101*a*-101*f*, 102*a*-102*f* and one or more sets of the enhancement data 103*a*-103*f*, 104*a*-104*f*, and these sets may be interrelated in a variety of ways. The media content 100 may only have a single set of the baseline media content 101*a*-101*f* and the enhancement data 103*a*-103*f* such that a computing device playing the media content 100 need only choose when (if at all) to retrieve the enhancement data 103*a*-103*f*. Alternatively, the media content 100 may have a plurality of sets of the baseline media content 101*a*-101*f*, 102*a*-102*f* and sets of the enhancement data 103*a*-103*f*, 104*a*-104*f* such that the decision-making by a computing device playing the media content 100 is significantly more complicated. The enhancement data 103*a*-103*f*, 104*a*-104*f* may be limited to one or more of the baseline media content 101*a*-101*f*, 102*a*-102*f*, or vice versa. After all, the advanced enhancement data 104*a*-104*f* may provide unsatisfying visual enhancement if applied to the basic baseline media content 101*a*-101*f*.

Figure 2:
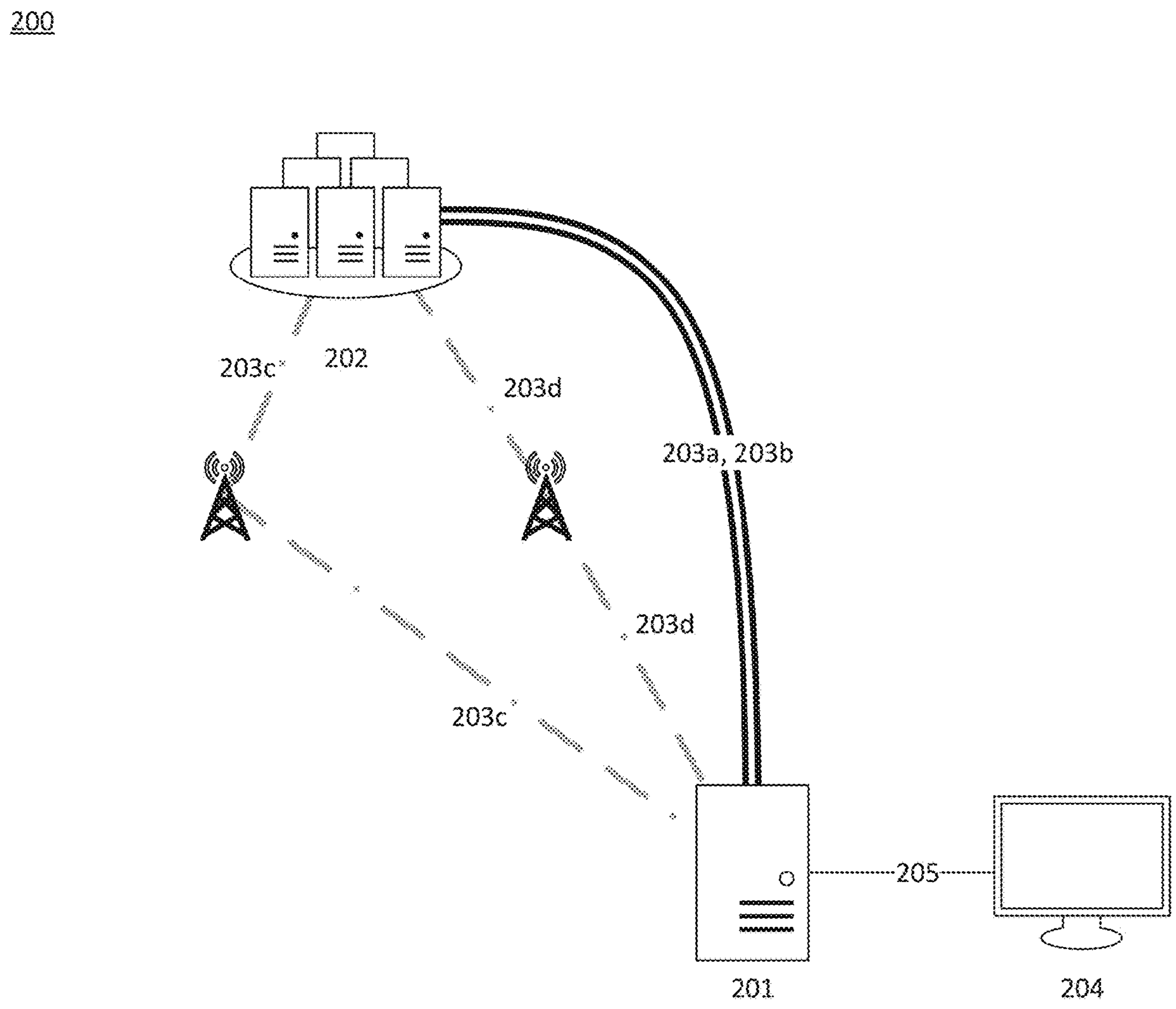
FIG. 2 shows a simplified communication network.

FIG. 2 depicts an example of a simplified communication network 200.

Computing device 201 may be any suitable device for processing media content 100. The computing device 201 may be connected over an interface 205 to a display 204. For example, the computing device 201, the display 204, and the interface 205 may all be a part of a television, smartphone, laptop, or other computing device or combination of computing devices. The computing device 201 and the display 204 may be separate such that, for example, the computing device 201 is a set-top box or video game console and the display 204 is a television or computer monitor connected via interface 205 (e.g., HDMI). The interface 205 may be physical or logical.

The computing device 201 may have the capability to cause display of video on the display 204 in a variety of formats, including high dynamic range formats, at high resolutions, or at high frame rates. The computing device 201 may have parameters (not pictured) which specify its capabilities and/or the capabilities of the display 204. Such parameters may be limited or otherwise modified based on a subscription service associated with the computing device 201. The computing device 201 may have one or more processors which may perform functions on or relating to the media content 100. The computing device 201 may have a processor which, based on the enhancement data 103*a*-103*f*, 104*a*-104*f*, modifies the baseline media content 101*a*-101*f*, 102*a*-102*f*.

The computing device 201 may be connected to a content source 202. The content source 202 may comprise one or more computing devices configured to store and/or transmit media content. The content source 202 may be a part of a content delivery network. The content source 202 may store or have access to the media content 100 and may also store or have access to one or more manifests (not pictured) associated with the media content 100. The content source 202 may communicate with the computing device 201 based on one or more communications protocols. For example, the content source 202 may transmit video content to the computing device 201 using the Dynamic Adaptive Streaming over HTTP ("DASH") protocol but make the baseline media content 101*a*-101*f*, 102*a*-102*f* available over file transfer protocol ("FTP"). Any appropriate protocol may be used, including HTTP Live Streaming ("HLS"), HTTP Dynamic Streaming ("HDS"), and/or Microsoft Smooth Streaming. The content source 202 need not be in the same physical location as the computing device 201. For example, one content source 202 storing the enhancement data 103*a*-103*f*, 104*a*-104*f* may be located at a home where the computing device 201 is located, and another content source 202 storing the baseline media content 101*a*-101*f*, 102*a*-102*f* may be located at a server farm hundreds of miles away from the computing device 201.

Interfaces 203*a*-203*d* may be one or more wired or wireless interfaces that connect, via a communication medium, computing device 201 and content source 202. Wired interfaces 203*a*, 203*b* may be, for example, HDMI, Ethernet, coaxial, and/or fiber optic. Wireless interfaces 203*c*, 203*d* may be, for example, Bluetooth, and/or IEEE 802.11 WiFi ("WiFi"), including cellular communications like LTE. The communications mediums associated with interfaces 203 need not be direct, but may be interrupted by intermediary computing devices such as network switches, amplifiers, splitters, and/or transmission towers. Interfaces 203 may be temporary or permanent. Indeed, computing device 201 need not maintain a wireless connection 203*c*, 203*d* at all times in order to save power. Interfaces 203*a*-203*d* may also be logical interfaces, rather than physical interfaces.

The computing device 201 may use interfaces 203*a*-203*d* separately or synchronously. The computing device 201 may request baseline media content and/or enhancement data for the media content 100 at different times or at the same time and over one or a plurality of interfaces 203*a*-203*d*. For example, a user may retrieve and store the baseline media content 101*a*-101*f* over a WiFi connection and, at a later time and when WiFi is no longer available (e.g., on a bus), retrieve the enhancement data 103*a*-103*f* over a cellular LTE connection. The computing device 201 may alternatively receive the baseline media content 101*a*-101*f*, 102*a*-102*f* and receive the enhancement data 103*a*-103*f*, 104*a*-104*f* over an interface at the same time. For example, the computing device 201 may receive both the advanced baseline media content 102*a*-102*f* and the advanced enhancement data 104*a*-104*f* at the same time over a high bandwidth fiber optic interface. As another example, a smartphone may use WiFi interface to download both the basic baseline media content 101*a*-101*f* and the basic enhancement data 103*a*-103*f* while inside a house, but the user of the smartphone may walk outdoors where the WiFi signal is weaker but an LTE signal is stronger. In that example, the computing device may start to retrieve either or both the baseline media content 101*a*-101*f* and the basic enhancement data 103*a*-103*f* over the LTE connection in addition to the (now weaker) WiFi interface.

The computing device 201 may transmit requests for the baseline media content 101*a*-101*f*, 102*a*-102*f* and/or the enhancement data 103*a*-103*f*, 104*a*-104*f*, and the content source 202 may transmit the baseline media content 101*a*-101*f*, 102*a*-102*f* and/or the enhancement data 103*a*-103*f*, 104*a*-104*f*, using one or more protocols. The content source 202 may communicate information relating to media content using a manifest, which may contain information relating to the media content 100, including information regarding and pointers to the baseline media content 101*a*-101*f*, 102*a*-102*f*, information regarding and pointers to the enhancement data 103*a*-103*f*, 104*a*-104*f*, and/or metadata relating to the media content 100. An example of a manifest is provided as FIG. 6 and is discussed in more detail below.

The computing device 201 may store all of or portions of the media content 100 over any time period. The computing device 201 may thereby not need to receive a portion of the media content 100 and may then base its selection of one or more of the interfaces 203*a*-203*d* on that basis. For example, the computing device 201 may receive and store a portion of the enhancement data 103*a*-103*f* before receiving a user selection of the media content 100, meaning that it only needs to request and receive the baseline media content 102*a*-102*f* and a remaining portion of the enhancement data 103*a*-103*f*.

The computing device 201 need not itself display the media content 100 but may instead transmit the media content 100 over one or more interfaces to a second computing device, such as a television, for display. For example, the computing device 201 may be a set-top box connected via a High-Definition Multimedia Interface ("HDMI") 2.1 interface to a television and via Ethernet and LTE to the content source 202. In that example, the computing device 201 may be configured to combine the advanced baseline media content 102*a*-102*f* over Ethernet and the advanced enhancement data 104*a*-104*f* over LTE and to transmit the combined media content to the display device over the HDMI 2.1 interface.

Figure 3:
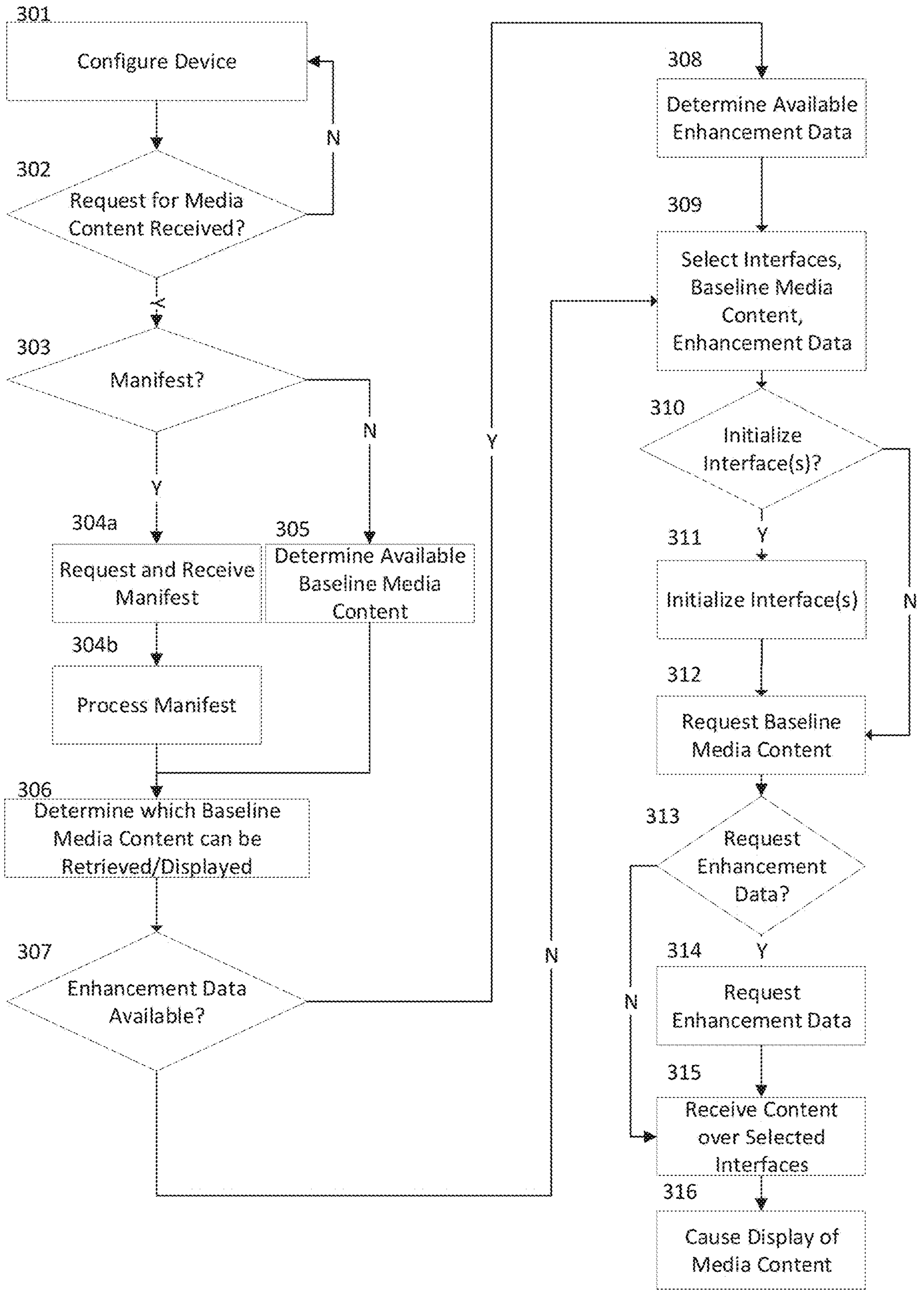
FIG. 3 is a flow chart showing steps which may be taken by a computing device.

FIG. 3 is a flowchart showing steps which may be taken by computing device 201. The steps depicted in FIG. 3 may additionally or alternatively be performed by the content source 202. The steps depicted in FIG. 3 may be rearranged or removed based on the manner in which the computing device 201 and the content source 202 are configured and one or more protocols used on the interfaces 203*a*-203*d*.

In step 301, either or both the computing device 201 and the content source 202 are configured. In step 301, the interfaces 203*a*-203*d* may also be determined. Such interfaces may be physical interfaces, such as an Ethernet or coaxial interface, or a wireless interface, such as a WiFi interface or LTE interface. To select one or more interfaces for receipt of the media content 100, the computing device 201 may determine what, if any, interfaces are available. The computing device 201 may simply determine which interfaces are connected and available for transmission of data. The computing device 201 may also determine interfaces that are not connected but which may be connected, such as a disconnected Ethernet port. This part of step 301 may be performed by an operating system executing on the computing device 201.

In step 301, network conditions relating to the interfaces 203*a*-203*d* may also be determined. Network conditions may comprise any measure of interface performance, including bandwidth, jitter, latency, lag, and/or encryption. The one or more interfaces available to the computing device 201 may have radically different network conditions which may influence whether such interfaces are appropriate for receiving media content. An interface with high bandwidth but excessive jitter may be useful for downloading large amounts of media content but inappropriate for streaming media content requiring low latency. An interface with high bandwidth but which is currently in use by another computing device or a program executing on the computing device 201 may have very little bandwidth currently available for receiving media content. The computing device 201 may store information relating to the determined network conditions. As with determining available interfaces, such information may be retrieved by an operating system executing on the computing device 201.

In step 301, costs and/or limitations associated with the one or more interfaces may also be determined. Certain Internet Service Providers ("ISPs") provide monthly bandwidth limitations on Internet use. Similarly, some interfaces may be associated with a cost, such as a cost per gigabyte of transmission. Such information may be relevant in selecting which, if any, interfaces are appropriate for receiving media content. Cost and/or limitations associated with one or more interfaces may be stored by the computing device 201, may be available via the content source 202, or may be available via an ISP server (not pictured).

Table 1 shows examples of information relating to the interfaces 203*a*-203*d* which may be determined in step 301. Although Table 1 shows four interfaces, the computing device 201 may have any number of interfaces.

TABLE 1

Example Interface Information

| Interface | Connectivity Status | Available Bandwidth | Latency |
|---|---|---|---|
| HDMI | Disconnected | 3.96 Gbps (if connected) | 1 ms |
| Ethernet | Connected | 9 Mbps | 120 ms |
| Bluetooth | Connected | 2.1 Mbps | 200 ms |
| USB | Disconnected | 12 Mbps | 30 ms |

In step 301, additional information relating to the computing device 201 and/or the content source 202 may also be determined and/or stored. Because the computing device 201 may only be capable of processing (and/or the display 204 may only be capable of displaying) certain formats of video or audio, the computing device 201 may determine and/or store such information to avoid retrieval of the baseline media content 101*a*-101*f*, 102*a*-102*f* and the enhancement data 103*a*-103*f*, 104*a*-104*f* which cannot be processed/displayed. Such capabilities may be stored as one or more parameters. Because the content source 202 may serve a large number of clients and have limited capabilities to transmit certain data based on, for example, bandwidth limitations, the load and/or bandwidth limitations of the content source 202 may be determined and/or stored. Similar limitations may apply to the computing device 201: for example, if the computing device 201 is a cell phone with a battery, it may have limited power for certain processing or retrieval operations.

In step 301, either or both the computing device 201 and the content source 202 may also determine a user account associated with the computing device 201, including content limitations which may be associated with the user account. Such determinations may be stored at either or both the computing device 201 or the content source 202. Such information may already be stored as part of a login process for the user account.

In step 301, either or both the computing device 201 and the content source 202 may also determine rules associated with the media content 100, the interfaces 203*a*-203*d*, the computing device 201, or the content source 202. Such determinations may be stored at either or both the computing device 201 or the content source 202. For example, the computing device 201 may be restricted from accessing certain of the interfaces 203*a*-203*d* except during certain times of the day. The media content 100 may be only accessible during certain times or in certain geographic locations due to, for example, applicable licensing agreements.

In step 302, a request for the media content 100 may be received. For example, a user may select a movie or television show, may select streaming content, or may tune to a particular channel. This request is ultimately received by either or both the computing device 201 or the content source 202. The request may be made by the user via a listing on a computer, on a digital video recorder guide, on a cell phone, or other similar computing device, and ultimately transmitted to either or both the computing device 201 or the content source 202. The request may contain an indication of the requested content and may contain further information relating to the request, such as a desired format and/or language. For example, a user may request a 4K movie in Spanish on a cell phone, and the request (comprising an indication of the movie, the format (4K), and the language (Spanish)) may be ultimately transmitted to either or both the computing device 201 or the content source 202.

In step 303, the computing device 201 may determine whether such a manifest is available. A manifest may be one or more files, a data stream, any other form of data. For example, a manifest may be an XML file stored by the content source 202, as depicted in FIG. 6 and discussed more below. The content source 202 may generate one or more manifests based on the computing device 201 or properties associated with the computing device 201, such as the parameters associated with the computing device 201 or a user account associated with the computing device 201. The content source 202 may generate a limited manifest for a first computing device 201 with limited playback capabilities, but may provide a more detailed manifest for a second computing device 201 with more robust playback capabilities. The determination of whether a manifest exists may be as simple as checking a predetermined Uniform Resource Locator ("URL") for the existence of an XML file pertaining to the media content 100.

A manifest may be available based on considerations such as the manner in which the computing device 201 receives the media content 100 from the content source 202. If the content source 202 streams the baseline media content 101*a*-101*f* and does not provide it as a series of files, a manifest need not exist or may exist only for the enhancement data 103*a*-103*f*, 104*a*, 104*f*. The computing device 201 could simply tune to a particular channel to receive the baseline media content 101*a*-101*f*, 102*a*-102*f*. Conversely, if the content source 202 provides the baseline media content 101*a*-101*f*, 102*a*-102*f* over the Internet, a manifest may be used to provide data about media content 100.

If a manifest is available, in step 304*a*, the manifest may be requested and received by the computing device 201. If the manifest is already stored by the computing device 201, then request and receipt is not necessary, and this step may be skipped.

In step 304*b*, the manifest may be processed by the computing device 201 to at least identify the baseline media content 101*a*-101*f*, 102*a*-102*f* and any of the enhancement data 103*a*-103*f*, 104*a*-104*f* for the media content 100. As depicted in FIG. 6 and further explained below, a manifest may be an XML file containing information relating to the media content 100, the baseline media content 101*a*-101*f*, 102*a*-102*f*, and any of the enhancement data 103*a*-103*f*, 104*a*-104*f*. Such an XML file may require processing by the computing device 201.

If the manifest is unavailable per step 303, in step 305, computing device 201 may use any other appropriate protocol or method to determine available sets of the baseline media content 101*a*-101*f*, 102*a*-102*f* in step 306. Such a determination may be as simple as recognizing that only one set of the basic baseline media content 101*a*-101*f* is streaming over one or more interfaces (e.g., that a channel available via an antenna corresponds to a 720p version of media content). In such a circumstance, the computing device 201 may retrieve one or more frames from the basic baseline media content 101*a*-101*f*, calculate information about the streaming basic baseline media content such as the frame rate and resolution of the baseline media content based on the frame(s), and store such information.

In step 306, the computing device 201 may determine which of the baseline media content 101*a*-101*f*, 102*a*-102*f* that it may retrieve and display. The computing device 201 need not retrieve any of the baseline media content 101*a*-101*f*, 102*a*-102*f* in step 306, and the computing device 201 may only determine which of the baseline media content 101*a*-101*f*, 102*a*-102*f* it could potentially retrieve and display. For example, if the computing device 201 can only display the basic baseline media content 101*a*-101*f*, it may only determine the pointers to the basic baseline media content 101*a*-101*f*. Such a determination may be based on information available to the computing device 201 regarding the baseline media content 101*a*-101*f*, 102*a*-102*f*. For example, if the computing device 201 is connected to the display 204 and that display can only display 720p video, then the computing device 201 may use information contained in a manifest to determine the baseline media content 101*a*-101*f*, 102*a*-102*f* which is 720p.

In step 307, the computing device 201 may determine whether enhancement data is available for the requested media content. Enhancement data might not be available: for example, an old television show is unlikely to have HDR10 enhancement data even if it has been remastered to a 720p or higher resolution. Some forms of the media content 100 may have a large number of sets of enhancement data: for example, a large blockbuster movie may have a wide variety of different forms of enhancement data such that viewers can best enjoy the movie regardless of whether it is viewed on a cell phone, an HDR-capable projector, or a HDR10-capable television.

In step 308, and if enhancement data is available in step 307, the computing device 201 may determine which sets of the enhancement data 103*a*-103*f*, 104*a*-104*f* it may retrieve and process. Multiple sets of the enhancement data 103*a*-103*f*, 104*a*-104*f* may be available to the computing device 201. Information relating to such sets of the enhancement data 103*a*-103*f*, 104*a*-104*f* may be contained in the manifest. Alternatively, the computing device 201 may analyze the streams and determine various parameters of enhancement data, such as the format of the stream, by inspecting the enhancement data, including one or more headers contained in the enhancement data.

As with the baseline media content 101*a*-101*f*, 102*a*-102*f*, the computing device 201 may determine the enhancement data 103*a*-103*f*, 104*a*-104*f* which it may retrieve. The computing device 201 may only determine information regarding and pointers to enhancement data which it may process and use on the baseline media content 101*a*-101*f*, 102*a*-102*f*. As with the baseline media content 101*a*-101*f*, 102*a*-102*f*, the computing device 201 may not actually retrieve or store enhancement data in this step.

An example of steps 306, 307, and 308 shows determination of the baseline media content 101*a*-101*f*, 102*a*-102*f* and the enhancement data 103*a*-103*f*, 104*a*-104*f*. A smartphone may retrieve, from a content source, an XML manifest. The XML manifest may indicate 5 different sets of baseline media content, each comprising a different resolution and different framerate. The XML manifest may also indicate 8 different sets of enhancement data, each corresponding to a different degree of color correction. The smartphone may process the XML manifest and discover the 5 different sets of baseline media content and 8 different sets of enhancement data. The smartphone need not, at this stage, store pointers to or information about baseline media content and/or enhancement data which cannot be displayed by the smartphone. For example, a 4K version of a video may be too computationally intensive for the smartphone under any circumstance, or the 4K video may simply be too large for the smartphone to retrieve and cache. The smartphone may determine a list of pointers to 3 different sets of baseline media content and 4 different sets of enhancement data which it may retrieve and display. These lists may look similar to the examples of Tables 2 and 3.

TABLE 2

Example Baseline Media Content List

| Baseline Media Content ID | Video Resolution | Frame Rate | File Size |
|---|---|---|---|
| 1 | 1920 × 1080 | 60 fps | 150 MB |
| 4 | 1280 × 720 | 30 fps | 60 MB |
| 5 | 640 × 480 | 24 fps | 15 MB |

TABLE 3

Example Enhancement Data List

| Enhancement Data ID | Format | Baseline Media Content ID Compatibility | File Size |
|---|---|---|---|
| 1 | Basic HDR | 1, 4 | 10 MB |
| 4 | Intermediate HDR | 1 | 30 MB |
| 5 | Advanced HDR | 1 | 50 MB |
| 6 | Extreme HDR | 1 | 100 MB |

In Table 2, the computing device 201 in the example has three sets of baseline media content which it may display, corresponding to 1080p, 720p, and 480p versions of media content. This baseline media content has different frame rates and different file sizes. The computing device in this example has also constructed a listing of enhancement data, as shown in Table 3. Each enhancement data has a different format and file size. Moreover, while the Basic HDR enhancement data is compatible with both the 1080p and 720p versions of the media content (represented by baseline media content IDs 1 and 4, respectively), the Intermediate HDR, Advanced HDR, and Extreme HDR enhancement data may only be compatible with the 1080p version of the media content (represented by baseline media content ID 1). Tables 2 and 3 are examples and may not reflect all implementations of baseline media content and enhancement data. For example, there may not be separate Packetized Elementary Streams ("PES") such that the computing device 201 need not be capable of bifurcating some forms of baseline media content from corresponding enhancement data.

In step 309, the computing device 201 may select one or more of the interfaces, baseline media content, and enhancement data. As explained below, the decision-making process for these three selections may be interrelated based on a variety of factors.

Selection of one or more of the interfaces 203*a*-203*d*, the baseline media content 101*a*-101*f*, 102*a*-102*f*, and/or the enhancement data 103*a*-103*f*, 104*a*-104*f* may be based on network conditions associated with the interfaces 203*a*-203*d*. An interface with low bandwidth, high jitter, high latency, and/or other undesirable traits need not be selected. Conversely, an interface with high bandwidth, low jitter, low latency, and/or other desirable traits may be selected. The availability of a high bandwidth and low latency interface may allow computing device 201 to select enhancement data or baseline media content requiring high bandwidth or low latency; conversely, lack of sufficient bandwidth or the presence of high latency may cause computing device 201 to not select certain enhancement data or baseline media content. The baseline media content 101*a*-101*f*, 102*a*-102*f* and/or the enhancement data 103*a*-103*f*, 104*a*-104*f* may be received over a plurality of interfaces, and the computing device 201 may select among such interfaces, baseline media content, and enhancement data based on the total available bandwidth, average latency, other interface characteristics.

Because network conditions may influence selection of one or more interfaces, baseline media content, and/or enhancement data, in step 309, the computing device 201 may take steps to improve network conditions. The computing device 201 may disable one or more programs executing on the computing device 201 which are using one or more interfaces. The computing device 201 may prompt a user to move the computing device 201 closer to a transmission tower or to use a different or better cable in establishing one or more interfaces.

Selection of one or more of the interfaces 203*a*-203*d*, the baseline media content 101*a*-101*f*, 102*a*-102*f*, and/or the enhancement data 103*a*-103*f*, 104*a*-104*f* may be based on an importance of any portion of the media content 100. The importance of a portion of the media content 100 may be any evaluation of the relative significance of the portion of the media content 100, whether standing alone, as compared with other portions of the media content 100, or as compared with other media content. For example, in a war movie, a dramatic battle scene might be considered more important than the credits sequence. Similarly, a feature film may be considered more important overall than a weather broadcast. Importance may relate to subjective importance (e.g., viewer interest in the portion of the media content) and/or importance with regard to enhancement data (e.g., how well enhancement data may improve the scene). The importance may be provided by the content creator or may be determined based on, for example, the script (e.g., by analyzing the closed captioning for the media content to determine certain keywords), the frequency in which a portion of the media content has been viewed, or a user rating of the portion of the media content.

The media content 100 may have a plurality of importance ratings: one for the media content itself (e.g., a high importance rating for a feature film, a low importance rating for a weather report), and a plurality for any portions of the media content (e.g., different scenes, time segments, and/or episodes). The media content 100 may have a timeline of importance values in metadata such that, for different portions of the media content 100, different importance values may exist. The importance of a portion of the media content 100 may change over time. For example, a feature film may have a first importance rating for its opening, a second importance rating for exposition portions of the film, a third importance rating for rising action portions of the film, a fourth importance rating for the climax of the film, a fifth importance rating for falling action portions of the film, a sixth importance rating for resolution portions of the film, and a seventh importance rating for a credits sequence. The portions of the media content 100 with different importance ratings may be in the same time segments (e.g., thirty second time segments, corresponding to the baseline media content 101*a*-101*f*, 102*a*-102*f*) or may be entirely independent of other time segments associated with the media content 100. The importance rating may, for example, be provided as a function of time (e.g., as a series of exponentials, wherein time is a variable), may be provided as a value corresponding to a particular time segment.

An importance value corresponding to the media content 100 may be modified by the computing device 201. An importance value may be scaled by the computing device 201 to account for, for example, the properties of display and/or audio devices connected to the computing device 201, the capabilities of the computing device 201, and/or a threshold. For example, importance values for media may range from 1 to 7, and the computing device may scale these values (e.g., from 1 to 100) such that a threshold (e.g., a threshold at 50) may be applied. In this manner, the computing device 201 may receive importance values in a variety of formats and adjust them for any applicable threshold.

The importance of the media content 100 may be compared against a threshold. For example, the importance may be ranked from one to ten, and the threshold may be, by default, a rating of five, such that any portion of the media content 100 ranked above a five is retrieved by the computing device 201. The threshold may be determined and/or modified based on the importance of the media content 100: for example, a movie may have a lower threshold than a news broadcast, meaning that enhancement data is more likely to be retrieved (and/or interfaces are more likely to be selected/initialized) for the movie than the news broadcast. The threshold may also be based on a user preference such that, for example, a user may request to retrieve more (or less) enhancement data for media content, a type of media content, and/or a genre of media content. The threshold may be based on an account associated with the computing device (e.g., retrieving more enhancement data or selecting/initializing more interfaces for a premium account), a channel (e.g., such that enhancement data is rarely retrieved for a news channel), or an available amount of bandwidth (e.g., such that a portion of the media content 100 must be significant to justify use of limited bandwidth).

The threshold may be adjusted during playback of the media content 100. The threshold may change based on changing network conditions associated with one or more of the interfaces 203*a*-203*d* of the computing device 201. For example, in response to sudden network congestion, the computing device 201 may raise the threshold such that less enhancement data is received. A user may provide feedback (e.g., using an interface on the computing device 201) to indicate a desire for better quality video, causing the threshold to lower.

A threshold may be determined based on the properties of computing device 201. The video and audio playback capabilities of computing device 201 may affect the level of the threshold, and the threshold may be different depending on whether the enhancement data 103*a*-103*f*, 104*a*-104*f* is audio enhancement data, video enhancement data, or both. For example, the computing device 201 may have excellent video capabilities (e.g., computing device 201 may be connected to a 4K HDR television) but subpar audio capabilities (e.g., low-quality speakers without a subwoofer) such that the threshold may be lower for video enhancement data than it is for audio enhancement data.

The enhancement data 103*a*-103*f*, 104*a*-104*f* may also have corresponding importance ratings. For example, some enhancement data (e.g., HDR10 data) may have a significant impact on the baseline media content 101*a*-101*f*, 102*a*-102*f*, whereas other enhancement data (e.g., stock ticker information for a news channel) may be relatively unimportant. Such importance information may also be used to determine whether to receive enhancement data, what enhancement data to retrieve, and whether/how to select/initialize interfaces. For example, the computing device 201 might not retrieve enhancement data if it is of low importance, or may retrieve the enhancement data but not initialize a costly interface to do so. As with the importance of the portion of the media content 100, the computing device 201 may set a threshold of importance for the enhancement data 103*a*-103*f*, 104*a*-104*f*.

Selection of one or more of the interfaces 203*a*-203*d*, the baseline media content 101*a*-101*f*, 102*a*-102*f*, and/or the enhancement data 103*a*-103*f*, 104*a*-104*f* may also be based on parameters associated with the computing device 201. The computing device 201 may have limited processing resources available to apply enhancement data to baseline media content, causing the computing device 201 to not request the enhancement data 103*a*-103*f*, 104*a*-104*f* or to request the basic enhancement data 103*a*-103*f*. The computing device 201 may have limited storage resources to store the enhancement data 102*a*-102*f*, 103*a*-103*f* or the baseline media content 101*a*-101*f*, 102*a*-102*f*. In this step, the computing device 201 may take additional steps necessary to free up processing resources and/or storage resources, such as disabling programs executing on the computing device 201. Display abilities relating to the computing device 201 may further affect selection of the baseline media content 101*a*-101*f*, 102*a*-102*f* or the enhancement data 102*a*-102*f*, 103*a*-103*f*. For example, the computing device 201 may be capable of displaying 1080p video content but may only display baseline media content on half its screen, making retrieval of 1080p baseline media content unnecessary.

Selection of one or more of the interfaces 203*a*-203*d*, the baseline media content 101*a*-101*f*, 102*a*-102*f*, and/or the enhancement data 103*a*-103*f*, 104*a*-104*f* may also be based on information contained in one or more manifests associated with the media content 100 as processed in step 304*b*. As discussed above in the context of steps 303, 304*a*, and 304*b*, a manifest may contain information about the baseline media content 101*a*-101*f*, 102*a*-102*f* or the enhancement data 103*a*-103*f*, 104*a*-104*f* which may affect the decision on whether or not to retrieve such content, such as the degree to which a set of enhancement data enhances baseline media content. A manifest may contain a ranking of the importance of a scene associated with a portion of a set of baseline media content, which may influence whether the computing device 201 initializes additional interfaces for the portion of the set of baseline media content. The computing device 201 may use information in a manifest to prioritize limited resources: the computing device 201 may use more resources (e.g., bandwidth, storage space) to retrieve the best quality portions of the most important portions of the media content 100 and to use fewer resources to retrieve less important portions of the media content 100.

Selection of one or more of the interfaces 203*a*-203*d*, the baseline media content 101*a*-101*f*, 102*a*-102*f*, and/or the enhancement data 103*a*-103*f*, 104*a*-104*f* may also be based on costs associated with the media content 100, the computing device 201, the content source 202, and/or the interfaces 203*a*-203*d*. The costs of data transmission over the interfaces 203*a*-203*d* may influence whether or not such interfaces are initialized or used by the computing device 201. The computing device 201 may seek to retrieve the baseline media content 101*a*-101*f*, 102*a*-102*f* and the enhancement data 103*a*-103*f*, 104*a*-104*f* over the cheapest interface possible for all but the most important scenes of the media content 100. The cost of the media content 100 may also influence such selection: for example, the purchase of an expensive movie may warrant use of the most expensive interfaces and the best baseline media content and enhancement data.

Selection of one or more of the interfaces 203*a*-203*d*, the baseline media content 101*a*-101*f*, 102*a*-102*f*, and/or the enhancement data 103*a*-103*f*, 104*a*-104*f* may also be based on one or more user accounts associated with the media content 100, the computing device 201, the content source 202, and/or the interfaces 203*a*-203*d*. A premium user account may be associated with the selection of better interfaces, baseline media content, and enhancement data; conversely, a lower-level user account may be restricted from using certain interfaces, baseline media content, or enhancement data, even if such interfaces, baseline media content, and enhancement data are otherwise available to computing device 201.

Selection of one or more of the interfaces 203*a*-203*d*, the baseline media content 101*a*-101*f*, 102*a*-102*f*, and/or the enhancement data 103*a*-103*f*, 104*a*-104*f* may also be based on the availability or status of all or a portion of the content source 202. The content source 202 may simultaneously serve a large number of users such that it may lack the bandwidth or processing resources to transmit advanced baseline media content or advanced enhancement data to the computing device 201. For similar reasons, the content source 202 may be unable to use one or more interfaces. Such limitations may be particularly relevant for new and popular content. For example, if a new episode of a television show is made available at a specific time such that thousands of viewers attempt to view the new episode at the same time, the content source 202 may lack the bandwidth, processing facilities, or other capabilities necessary to provide the highest quality version of the new episode to all users at once. As such, the computing device 201 may anticipate such a limitation and retrieve lower quality baseline media content and enhancement data or use a less popular interface to connect to the content source 202.

Selection of one or more of the interfaces 203*a*-203*d*, the baseline media content 101*a*-101*f*, 102*a*-102*f*, and/or the enhancement data 103*a*-103*f*, 104*a*-104*f* may also be based on interface rules determined based on a manifest or based on an analysis, by the computing device 201, of baseline media content, enhancement data, or one or more interfaces. Such interface rules are discussed in more detail below and with regard to FIG. 4.

Selection of one or more of the interfaces 203*a*-203*d*, the baseline media content 101*a*-101*f*, 102*a*-102*f*, and/or the enhancement data 103*a*-103*f*, 104*a*-104*f* may also be based on one or more rules associated with the media content 100, the computing device 201, the content source 202, and/or the interfaces 203*a*-230*d*. The computing device 201 may have a rule to only initiate an LTE connection with the content source 202 during certain hours of the day. The computing device 201 may have a rule to only retrieve advanced enhancement data for movies and to forego retrieving enhancement data for television shows. The computing device 201 may have a rule to limit use of an interface despite available bandwidth, to retrieve only certain resolutions of video content, or to use only certain forms of enhancement data despite the capability to use a greater variety of enhancement data.

Selection of one or more of the interfaces 203*a*-203*d*, the baseline media content 101*a*-101*f*, 102*a*-102*f*, and/or the enhancement data 103*a*-103*f*, 104*a*-104*f* may also be based on a user selection of the one or more interfaces, baseline media content, and/or enhancement data. For example, the computing device 201 may prompt a user to select one or more interfaces over which to retrieve baseline media content.

Selection of one or more of the interfaces 203*a*-203*d*, the baseline media content 101*a*-101*f*, 102*a*-102*f*, and/or the enhancement data 103*a*-103*f*, 104*a*-104*f* may also be based on previous or projected selections of the interfaces 203*a*-203*d*, the baseline media content 101*a*-101*f*, 102*a*-102*f*, and/or the enhancement data 103*a*-103*f*, 104*a*-104*f*. For example, to make quality changes less noticeable to a viewer, a computing device which, in a previous scene of the media content 100, displayed a high quality scene may retrieve progressively lower quality scenes over successive portions of the media content 100, rather than retrieve the lowest quality scene available. In this manner, the user may be less likely to notice an increase in compression artifacts or similar indicia of lower bitrate video.

Step 309 may be performed dynamically throughout the presentation of the media content 100. The computing device 201 may have the option to, for example, switch between two sets of the baseline media content (e.g., the baseline media content 101*a*-101*f*, 102*a*-102*f*) and may switch between no enhancement data and two different sets of the enhancement data (e.g., the enhancement data 103*a*-103*f*, 104*a*-104*f*). Thus, the computing device 201 may begin by requesting the advanced baseline media content 102*a* and the basic enhancement data 103*a* for the first thirty seconds, then request the basic baseline media content 101*a* and no enhancement data for the next thirty seconds, and so forth. Such switching may allow, for example, the computing device 201 to adapt to changing bandwidth, power, or other interface characteristics or computing device conditions. The dynamic nature of step 309 may allow the computing device 201 to prioritize certain scenes in or portions of the media content 100 over others. For example, the computing device 201 may only retrieve the advanced enhancement data 104*a*-104*f* for dark scenes where added HDR fidelity may be particularly advantageous.

Selection of one or more of the interfaces, baseline media content, and enhancement data may comprise use of a plurality of interfaces for retrieving either or both the baseline media content 101*a*-101*f*, 102*a*-102*f* and the enhancement data 103*a*-103*f*, 104*a*-104*f*. The computing device 201 may retrieve portions of the baseline media content 101*a*-101*f*, 102*a*-102*f* over multiple interfaces. The computing device 201 may retrieve the baseline media content 101*a*-101*f*, 102*a*-102*f* over one or more interfaces different from the interface(s) used to retrieve the enhancement data 103*a*-103*f*, 104*a*-104*f*.

In an example of step 309, the computing device 201 may begin retrieving the basic baseline media content 101*a* and the basic enhancement data 103*a* over the same Ethernet interface. Changing network conditions may make the Ethernet interface significantly less reliable. As such, the computing device 201 may elect to either retrieve the basic baseline media content 101*b* over the Ethernet interface and forego retrieval of the enhancement data 103*b* or 104*b*, or may prompt the computing device 201 to retrieve the enhancement data 103*b* or 104*b* over a second interface, such as an LTE interface. The network conditions for the Ethernet interface may significantly improve, providing the computing device 201 significantly more bandwidth than before. In turn, the computing device 201 may next retrieve the advanced baseline media content 102*c* and the advanced enhancement data 104*c* over the Ethernet interface. In response to network conditions yet again worsening, but a recognition that the scene depicted from 1:30 to 2:00 (column d) in the media content 100 is dark and would benefit from the advanced enhancement data 104*d*, the computing device may next retrieve the basic baseline media content 101*d* over the unreliable Ethernet interface and use its LTE interface to retrieve the advanced enhancement data 104*d*.

In steps 310 and 311, additional interfaces may be initialized. An interface, such as a wireless interface, may be selected by the computing device 201 but disabled or otherwise not in use. In step 310, the computing device 201 may determine that such an interface may be initialized by, for example, querying an operating system regarding the operating status of the interface. In step 311, computing device 201 to initialize such an interface.

In an example of steps 310 and 311, the computing device 201 may determine to retrieve the advanced baseline media content 102*a* over an Ethernet connection and the advanced enhancement data 104*a* over an LTE connection. The computing device 201 may query its operating system, which may indicate that its LTE radio is currently disabled for power savings reasons. The computing device 201 may cause the LTE radio to be enabled for transmission such that the LTE interface may be used.

As another example of use of a plurality of interfaces and initialization of an additional interface, the computing device 201 may have access to an unreliable Ethernet connection, an unreliable WiFi connection, and an expensive, reliable, but currently disabled LTE connection. For a given movie, the computing device may elect to retrieve the advanced baseline media content 102*a*-102*f* and the basic enhancement data 103*a*-103*f* over both the Ethernet connection and the WiFi connection, using both interfaces to reduce the impact of the unreliability of the interfaces. A scene in the movie may benefit from the advanced enhancement data 104*a*-104*f*; however, the combination of the unreliable Ethernet connection and unreliable WiFi connection may be insufficient to support both the continued retrieval of the advanced baseline media content 102*a*-102*f* and the retrieval of the advanced enhancement data 104*a*-104*f*. Thus, for the scene in question, the computing device 201 may initialize the LTE connection and retrieve the advanced enhancement data 104*a*-104*f* over the LTE connection.

In step 312, the computing device 201 may request the baseline media content 101*a*-101*f*, 102*a*-102*f* as selected in step 309. The computing device 201 may use an interface only for requests and reserve one or more separate interfaces for receiving either or both the baseline media content 101*a*-101*f*, 102*a*-102*f* and the enhancement data 103*a*-103*f*, 104*a*-104*f*. The request for the baseline media content 101*a*-101*f*, 102*a*-102*f* need not be made on a selected interface. The computing device may transmit a request for the baseline media content 101*a*-101*f*, 102*a*-102*f* over an interface incapable of receiving the baseline media content 101*a*-101*f*, 102*a*-102*f*.

As an example of requests for the media content 100 over an interface separate from those used to receive the baseline media content 101*a*-101*f*, 102*a*-102*f* and the enhancement data 103*a*-103*f*, 104*a*-104*f*, the computing device 201 may have an Ethernet interface ultimately accessing the Internet via a satellite Internet connection and an LTE interface. Like many satellite Internet connections, the Ethernet interface may thereby have an extremely slow upload speed, such as 256 Kbps, but may have a faster download speed, such as 1 Mbps. The computing device 201 may use the LTE interface to transmit a request for the media content 100 in order to avoid the upstream limitations associated with the Ethernet interface, but may receive the baseline media content 101*a*-101*f*, 102*a*-102*f* and the enhancement data 103*a*-103*f*, 104*a*-104*f* over the Ethernet interface.

In step 313-314, computing device 201 may request one or more enhancement data 103*a*-103*f*, 104*a*-104*f* if, in step 309, computing device 201 decided to request enhancement data 103*a*-103*f*, 104*a*-104*f*. This request may be made based on the selection process described in step 309. As with baseline media content 101*a*-101*f*, 102*a*-102*f*, this request may be made on any interface available to computing device 201, including an interface not selected in step 309.

In step 315, the computing device 201 may receive the selected baseline media content 101*a*-101*f*, 102*a*-102*f* and/or the selected enhancement data 103*a*-103*f*, 104*a*-104*f* over one or more of the selected interfaces 203*a*-203*d*.

In step 316, the computing device 201 may cause the display of the media content 100. The computing device 201 may be one or more display devices or may be connected to one or more display devices.

After step 316, the computing device 201 may return to step 309 and select new (or the same) interfaces, baseline media content, and enhancement data. For example, based on FIG. 1 and the flowchart of FIG. 3, the computing device 201 may have retrieved the basic baseline media content 101*a* and the basic enhancement data 103*a*. The computing device 201 may then return to step 309 and decide to receive the advanced baseline media content 102*b* and the advanced enhancement data 104*b* (e.g., the next thirty seconds of content) over the same or different interfaces.

The computing device 201 may choose an interface and enhancement data based on factors, including the visual fidelity of a scene and network conditions. FIG. 4 shows an example in which the computing device 201 may select amongst the available basic enhancement data 402*a*-402*f* and the advanced enhancement data 403*a*-403*f* and available interfaces in accordance with the features described herein. This example is based on a computing device with three possible interfaces: a stable but relatively low-bandwidth Ethernet connection, a low-bandwidth HDMI connection, and a low-bandwidth and costly LTE connection.

FIG. 4 shows media content 100, including baseline media content 401*a*-401*f*, basic enhancement data 402*a*-402*f*, and advanced enhancement data 403*a*-403*f*, on a timeline 404. There are three rows and six columns. Row 401 corresponds to basic baseline media content 401*a*-401*f*, row 402 corresponds to basic enhancement data 402*a*-402*f*, and row 403 corresponds to advanced enhancement data 403*a*-403*f*.

FIG. 4 further shows interface requirements. The interface requirements may be based on the visual fidelity of a scene. Generally, brightly lit scenes and little motion show compression artifacts and other video limitations less readily than darker scenes with more motion. Accordingly, to maintain visual quality throughout media content, some scenes may require better enhancement data (e.g., better dynamic range) than others. Such requirements may be summarized as "Low Visual Fidelity" (e.g., a brightly lit conversation scene), "Medium Visual Fidelity," and "High Visual Fidelity" (e.g., an action scene with lots of motion in a dark room). The interface requirements may be based on network conditions. As described above, bandwidth conditions may be as simple as, for example, an available bandwidth, jitter, latency, and/or lag measurement. For simplicity, such conditions may be summarized as "High," "Low," "Normal," and "Congested."

FIG. 4 shows how, for the media content 100 and across six different thirty-second segments of the media content 100, the computing device 201 may determine which interfaces to select and which enhancement elementals to retrieve.

As indicated by timeline 404, and like FIG. 1, each column in FIG. 4 may correspond to a thirty second segment of media content 100, that is, box 401*a* may be a thirty-second 1080p video of media content 100 starting at 0:00, box 401*b* may be a thirty-second 1080p video of media content 100 starting at 0:30, and so forth. For each thirty second segment, represented by a column (e.g., "a," "b," "c"), the computing device 201 has chosen to retrieve one of basic enhancement data, advanced enhancement data, or to not retrieve any enhancement data. For example, in column a, computing device 201 has chosen to retrieve the basic enhancement data 402*a*. Where the computing device 201 has not selected basic enhancement data or advanced enhancement data, the corresponding box for the enhancement data has been replaced with an empty box stating "Not Retrieved." For example, in column d, neither basic enhancement data nor advanced enhancement data have been selected.

Different portions of the media content 100 may have different interface requirements 405-409. For example, portions of a film which contain dark scenes with high motion may require high bandwidth, as such portions may more readily display compression artifacts to the viewer. In contrast, brightly-lit portions of a film with relatively little motion might not so readily make compression artifacts evident, meaning that lower bandwidth video content would be tolerable. As another example, if the media content 100 comprises a live sports event, excessive transmission delay over one or more interfaces may be undesirable. Such interface requirements may include, but are not limited to, five considerations detailed below.

Row 405 indicates the complexity of a scene in the media content 100. Such complexity may relate to how readily compression artifacts or bandwidth limitations may be evident in a respective thirty-second segment of the media content 100. For example, darker, faster scenes with more intricate detail are more likely to show compression artifacts and limitations in dynamic range than brightly-lit, simple, and slow-moving scenes. As such, the computing device 201 may mitigate such limitations by retrieving higher-quality baseline media content or enhancement data.

Row 406 indicates the subjective importance of a scene. Some segments of the media content 100, such as an advertisement or a credits sequence, may be of less subjective importance to a viewer than others. The computing device 201 may accordingly prioritize retrieval of more subjectively important scenes.

Row 407 indicates the minimum bandwidth required for portrayal of the baseline media content 401*a*-401*f*. The computing device 201 may have limited options for baseline media content such that, to play the media content 100 at all, a minimum bandwidth may be required. For example, the smallest version of the baseline media content 401*a* may be 100 megabytes (or 800 megabits), suggesting a minimum bandwidth of 26.67 Mbps (800 megabits divided by 30 seconds).

Row 408 indicates the tolerance of the particular segment for latency delays. If the media content 100 is a live sporting event, for example, latency delays may be less permissible than if the media content 100 is a movie. Tolerance for latency delays may be affected by the ability of the computing device 201 to cache either or both baseline media content or enhancement data: if insufficient memory is available for caching, the computing device 201 may have less tolerance for latency delays. As depicted in FIG. 4, tolerance is simply subjectively ranked as either "High" or "Low"; however, tolerance may be as detailed as desired: for example, the computing device 201 may only tolerate latency no greater than a predetermined time period.

Row 409 indicates the network congestion of the network ultimately connecting, through one or more interfaces, the computing device 201 and the content source 202. A network may become congested for reasons out of the control of either the computing device 201 and the content source 202; nonetheless, interface and retrieval decisions may be made on such congestion because congestion may adversely affect the bandwidth, latency, reliability, or other condition of one or more interfaces. While this row indicates "Low" and "High" for network congestion, the measurement of congestion may be as complicated or as simple as desired: the computing device 201 may simply determine latency, may receive a measurement of congestion from a network device, or may even predict congestion based upon predicted use of a network (e.g., predicting that a network in a residential area may become more congested in evenings, when more users are home).

Interface requirements need not be limited to technical requirements for an interface (e.g., a bandwidth requirement). Interface requirements may also or alternatively include a plethora of other considerations. For example, an interface requirement may provide that a certain portion of the media content 100 may only be played back during certain times (e.g., a scene in a horror movie may only be played at night or in October). An interface requirement may specify that certain, costlier interfaces may only be initiated for certain users of the computing device 201 to, for example, prevent children from inadvertently activating and incurring costs for LTE connections.

Interface requirements also need not be limited to a single specific interface. The computing device 201 may, for example, observe that interface requirements (e.g., a high bandwidth requirement) are not satisfied by any single interface and select multiple interfaces to satisfy the interface requirements.

Interface requirements may be contained in a manifest associated with media content 100.

For example, a manifest may specify that a scene is important and complex and requires a certain amount of bandwidth. A manifest may also provide information using which the computing device 201 may determine interface requirements: for example, the computing device 201 may use file size and duration information to approximate a bandwidth requirement.

If a manifest is unavailable, interface requirements may be based on an analysis, by the computing device 201, of the baseline media content 401*a*-401*f* and the enhancement data 402*a*-402*f*, 403*a*-403*f*. For example, streaming baseline media content may lack a manifest, but may contain header information which may be used to determine interface requirements.

Interface requirements may be used by the computing device 201 to select between the basic enhancement data 402*a*-402*f* and the advanced enhancement data 403*a*-403*f*. This selection corresponds to step 309 in FIG. 3 and is detailed below.

Column "a" corresponds to the baseline media content 401*a*, comprising the first thirty seconds of the media content 100. The scene complexity 405*a* is moderate, the scene subjective importance 406*a* is moderate, the minimum bandwidth 407*a* is 30 Mbps, the tolerance for latency delays 408*a* is high, and the network congestion 409*a* is low. This might be analogized to a base case, wherein the scene is not particularly important and there are no notable limitations indicated in the interface requirements. Given the moderate complexity and importance of the scene, the computing device 201 elects to retrieve the baseline media content 401*a* over its HDMI interface 410*a* and the basic enhancement data 402*a* over its Ethernet interface 412*a*.

Column "b" and "c" correspond to the baseline media content 401*b* and 401*c* and correspond to the second and third thirty-second segment of the media content 100. For both "b" and "c," the scene complexity 405*b*-405*c* and the scene subjective importance 406*b*-406*c* is high, the tolerance for latency delays 408*b*-408*c* is high, and the network congestion 409*b*-409*c* is high. The minimum bandwidth 407*b*-407*c* is 45 Mbps and 47 Mbps, respectively. In other words, the scene complexity and subjective importance has risen, the minimum bandwidth is higher, and the network has become more congested. In turn, the computing device 201 may determine that its HDMI interface remains sufficient to receive the baseline media content, but may determine that it needs additional bandwidth (or, simply, redundancy) to ensure the delivery of the advanced enhancement data 403*b*-403*c*. Put differently, in view of the importance of the scene, the computing device 201 may want to retrieve the best enhancement data it can, and seeks to select interfaces for that purpose. Accordingly, the computing device 201 may continue to use its HDMI interface 410*b*-410*c* to receive the baseline media content 401*b*-401*c*, but may use its LTE interface in conjunction with its Ethernet interface 412*b*-412*c* to receive the advanced enhancement data 403*b*-403*c*.

Columns "d" and "e" correspond to the baseline media content 401*d* and 401*e* and correspond to the fourth and fifth thirty-second segment of the media content 100. For both "d" and "e," the scene complexity 405*d*-405*e* is low, the scene subjective importance 406*d*-406*e* is low, the tolerance for latency delays 408*d*-408*e* is high, and the network congestion 409*d*-409*e* is low. The minimum bandwidth 407*d*-407*e* is 23 Mbps and 25 Mbps, respectively. Stated more broadly, the scene is significantly less important and complex and network conditions are positive. As such, the computing device 201 may decide to receive only the baseline media content 401*d*-401*e* over its HDMI interface 410*d*-410*e* as, in view of the interface requirements, the computing device 201 may determine that enhancement data might not sufficiently improve the baseline media content enough to be worth retrieving. While such a decision may seem counterintuitive from a quality perspective, the computing device 201 may make such a decision in order to, for example, conserve bandwidth and/or processing resources.

Column “f” corresponds to the baseline media content 401*f* and the sixth thirty-second segment of the media content 100. The scene complexity 405*f* is moderate, the scene subjective importance 406*f* is moderate, the minimum bandwidth 407*f* is 20 Mbps, the tolerance for latency delays 408*f* is low, and the network congestion 409*f* is high. Network conditions are thus particularly bad, and latency for this particular thirty-second segment is less tolerable. To best reduce latency and mitigate the worsened network conditions, the computing device 201 may retrieve the baseline media content 401*f* and the basic enhancement data 402*f* over its HDMI interface and its Ethernet interface 410*f*, 412*f* at the same time.

As discussed in more detail with regards to FIG. 3, the interface requirements 405-409 determined in FIG. 4 may be only a portion of the factors considered by the computing device 201 in selecting an interface, baseline media content, and/or enhancement data. The computing device 201 may elect to ignore one or more interface requirements and select baseline media content or basic enhancement data in defiance of one or more interface requirements. For example, a quality-focused user may cause the computing device 201 to only retrieve the advanced enhancement data 403*a*-*f* regardless of network conditions, in effect indicating that buffering is tolerable as long as the media content 100 is displayed at its highest quality. As another example, the computing device 201 in a restaurant may stream the media content 100 (e.g., a sports channel) continuously and determine to never retrieve enhancement data regardless of the importance or complexity of any given scene.

FIG. 5 is an example truth table for an example process by which computing device 201 may select from interfaces based on interface requirements. For convenience, interface requirements are simplified into four columns. Network latency, as discussed above, may refer to an overall time delay in transmission of information and may be acceptable for certain forms of media content (e.g., a movie) but not others (e.g., live sports). For the example of FIG. 5, “Low” network latency may be latency below 200 ms, whereas “High” network latency may be latency at or above 200 ms. Scene importance, as also discussed above, may merely indicate a subjective importance (here, “High” importance or “Low” importance) of a scene in media content such that certain scenes (e.g., plot twists, dramatic reveals) may be prioritized over others (e.g., advertisements, credits sequences). Subscription level, which may alternatively be referred to as a service level, corresponds to whether the computing device 201 is associated with a higher-tier subscription service (e.g., a more expensive service potentially guaranteeing better quality video) or a lower-tier subscription service. Bandwidth requirement corresponds to the amount of bandwidth required to retrieve content. For the example of FIG. 5, “High” may mean over 40 Mbps, where “Low” may be at or below 40 Mbps. In the circumstance of FIG. 5, the selection of baseline media content and enhancement data is ignored to focus more deeply on interface selection; however, as indicated above and in FIGS. 3 and 4, the selection of baseline media content and enhancement data may be made along with the selection of one or more interfaces over which to receive selected baseline media content and enhancement data.

In the example of FIG. 5, the computing device 201 has two possible interfaces: an WiFi connection, and an LTE connection. The WiFi connection in this case may be the cheapest connection per megabyte; however, the connection may have relatively low bandwidth (e.g., 30 Mbps). In comparison, the LTE connection may be costlier due to an applicable cellular subscription service but may have higher bandwidth. For example, computing device 201 could be a smartphone being used in a coffee shop on overburdened public WiFi such that the LTE connection, despite its costs, is significantly faster and more reliable.

Rows 501-504 indicate a circumstance where network latency is low and scene importance is high. If the computing device 201 is associated with a high level subscription (rows 501-502), computing device 201 may use a higher bandwidth and costlier interface even if the bandwidth requirement is low to ensure receipt of the important scene. Conversely, for a low-level subscription (rows 503-504), the computing device 201 may instead always use a lower-bandwidth, cheaper interface. This approach may allow a content provider to recoup costs associated with the LTE transmission via subscription fees.

Rows 505-508 indicate a circumstance where network latency is low and scene importance is low. For a high subscription level (rows 505-506), the computing device 201 may still use LTE in response to a high-bandwidth requirement (row 505), but may use WiFi for a low-bandwidth requirement (Row 506). Conversely, for a low subscription level (rows 507-508), the computing device 201 may always use WiFi. In this way, bandwidth requirements may influence interface selection for a computing device associated with a high-level subscription service, but low-level subscription services may be relegated to cheaper interfaces regardless of bandwidth requirements such that users may be forced to tolerate lag or buffering.

Rows 509-512 indicate a circumstance where network latency is high and scene importance is high. This may be a particularly bad circumstance where, for example, the media content 100 is a live sporting event, and the scene in question is an important play. The computing device 201 may therefore take steps to, as best as practicable, mitigate latency. If the computing device 201 is associated with a high-level subscription (rows 509-510), the computing device 201 may use both WiFi and LTE. Conversely, if the computing device 201 is associated with a low-level subscription (rows 511-512), the computing device 201 may use LTE in response to a high bandwidth requirement (row 511) but not a low bandwidth requirement (row 512). The computing device 201 may thereby select LTE despite its low-level subscription service in special cases. Such LTE interface use by a computing device associated with a low-level subscription service may be limited (e.g., time-limited) to prevent overuse or abuse.

Rows 513-516 indicate a circumstance where network latency is high and scene importance is low. In such a circumstance, the computing device 201 may have marginally more tolerance for latency, as the scene (e.g., a credits sequence) might not require playback perfection. If the computing device 201 is associated with a high level subscription (rows 513-514), the computing device may use both WiFi and LTE at the same time. Conversely, if the computing device 201 is associated with a low-level subscription (rows 515-516), it may use only WiFi. In this way, even for relatively unimportant scenes, the computing device 201 may use both interfaces to provide computing devices associated with a high-level subscription with the best possible experience, and computing devices associated with low-level subscriptions may be forced to tolerate undesirable lag or buffering.

The computing device 201 may select interfaces on a much more granular basis than is indicated by the binary conditions presented in the interfaces shown in FIG. 5. For example, network latency may be broken into a number of categories (e.g., 0-50 ms as great, 50-100 ms as good, 100-200 ms as tolerable, 200+ms as a problem). A subscription might not be associated with a level, but rather a duration: for example, the computing device 201 may be associated with a subscription which allows 10 hours of LTE interface use.

FIG. 6 shows an example manifest which may be stored by the content source 202.

A manifest may comprise information relating to media content 100, such as pointers to one or more sets of baseline media content 101*a*-101*f*, 102*a*-102*f*, pointers to one or more sets of enhancement data 103*a*-103*f*, 104*a*-104*f*, and metadata relating to media content 100. In FIG. 6, the manifest is depicted as an XML file containing pointers to baseline media content 101*a*-101*f*, 102*a*-102*f* and enhancement data 103*a*-103*f*, 104*a*-104*f*.

Though FIG. 6 is depicted as an XML file, a manifest need not be an XML file, or a file at all. For example, a manifest may be metadata or streaming data containing information relating to the media content 100.

FIG. 6 lines 1-4 provide information relating to all of the baseline media content and the enhancement data for media content 100. Line 2, "<subscriberlimit subscriber='all'>" may indicate that all users may access the media content 100 in question. Line 3, "<timespacing t='30 s'>" may denote an increment of 30 seconds per the baseline media content 101*a*-101*f*, 102*a*-102*f* and/or the enhancement data 103*a*-103*f*, 104*a*-104*f*. In other words, line 3 tells the computing device 201 that every segment of baseline media content or enhancement data comprises thirty seconds.

Lines 5-38 provide two sets of the baseline media content (where "type='video'") and two sets of the enhancement data (where "type='hdr'" and "type='hdr10'"). Lines 6-13 indicate the basic baseline media content 101*a*-101*f* associated with a 1080p ("res='1080'"), 30 fps ("fr='30'") version of the media content 100 is available to all subscribers ("level='all'"). Lines 14-21 indicate the advanced baseline media content 102*a*-102*f* associated with a 4K ("res='4K'"), 60 fps ("fr='60'") version of the media content 100 is available only to premium subscription users ("level='premium'"). Lines 22-29 indicate the basic enhancement data 103*a*-103*f* associated with HDR improvement ("type='hdr'") is available to all subscribers ("level='all'"). Lines 30-37 indicate the advanced enhancement data 104*a*-104*f* associated with HDR10 improvement ("type='hdr10'") is available only to premium subscription users ("level='premium'") and is only usable to improve 4K baseline media content ("limit='4K'").

Both the baseline media content 101*a*-101*f*, 102*a*-102*f* and the enhancement data 103*a*-103*f*, 104*a*-104*f* may be ordered for display. This is represented in FIG. 6 by "id='1'." Accordingly, if the computing device 201 wished to play the first portion of a 4K, 60 fps, HDR form of media content 100, it may retrieve the baseline media content associated with the first 4K, 60 fps baseline media content 102*a* at line 15 (wherein "id='1'"), and may retrieve the enhancement data associated with HDR playback of media content 100 at line 23 (wherein, similarly, "id='1'").

A manifest may contain information that allows either or both the computing device 201 or the content source 202 to determine interface requirements, select interfaces, and/or determine which the baseline media content 101*a*-101*f*, 102*a*-102*f* and/or the enhancement data 103*a*-103*f*, 104*a*-104*f* to receive. As indicated above, lines 7-12, 15-20, 23-28, and 31-36 indicate both a ranking of (e.g., "rank='5'") and a size of (e.g., "size='40 MB'") each of the baseline media content 101*a*-101*f*, 102*a*-102*f* and the enhancement data 103*a*-103*f*, 104*a*-104*f*. Rankings may be any characterization of an all or a portion of the baseline media content 101*a*-101*f*, 102*a*-102*f* or the enhancement data 103*a*-103*f*, 104*a*-104*f*. The baseline media content 101*a*-101*f* may be ranked based upon, for example, the importance of the scene, the amount of motion in the scene, and/or the popularity of the scene. The enhancement data 103*a*-103*f*, 104*a*-104*f* may be ranked based on the degree to which the enhancement data improves the baseline media content 101*a*-101*f*, 102*a*-102*f*. All or a portion of the baseline media content 101*a*-101*f*, 102*a*-102*f* or the enhancement data 103*a*-103*f*, 104*a*-104*f* may be further described in terms of length, file size, bit rate, or other relevant characterizations.

The baseline media content 101*a*-101*f*, 102*a*-102*f* and/or the enhancement data 103*a*-103*f*, 104*a*-104*f* may be limited and interrelated in any appropriate manner. As depicted in lines 6-13 and 22-29, the baseline media content 101*a*-101*f* and the enhancement data 103*a*-103*f* are available to all of the requesting computing devices 201 ("level='all'"). But in lines 14-21 and 30-37, the baseline media content 102*a*-102*f* and the enhancement data 104*a*-104*f* are limited to the computing device 201 associated with a premium subscription service ("level='premium'"). Limitations may also be based on interrelations between the baseline media content 101*a*-101*f*, 102*a*-102*f* and the enhancement data 103*a*-103*f*, 104*a*-104*f*. For example, line 30 indicates that the advanced enhancement data 104*a*-104*f* are limited to 4K video playback; that is, that they may only be displayed in conjunction with 4K video, in contrast with 1080 video.

Figure 7:
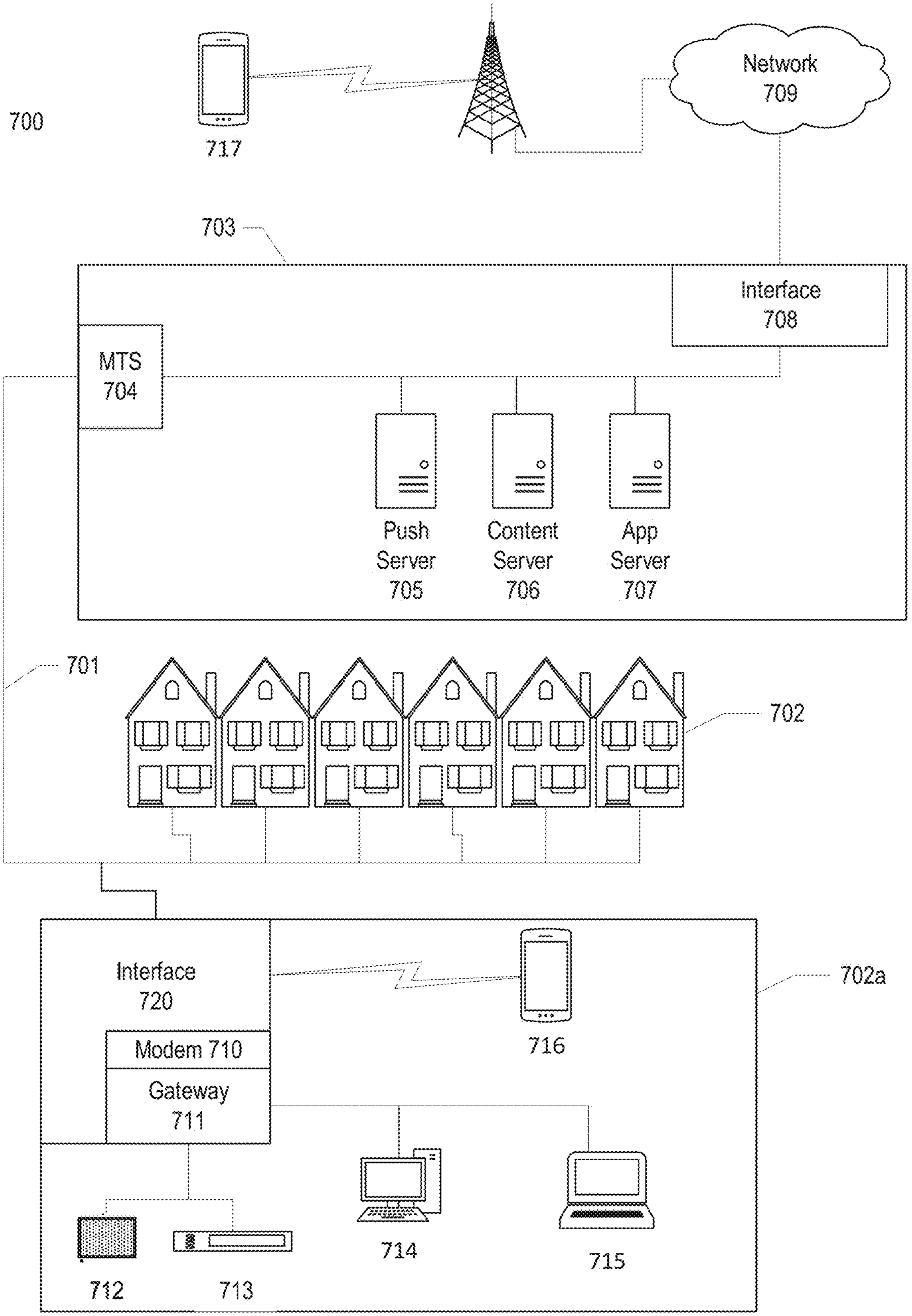
FIG. 7 shows an example communication network.

FIG. 7 shows a communication network 700 on which a network such as depicted in FIG. 2 may be implemented. Computing devices, such as computing device 201, may include a laptop computer 715, a mobile device (e.g., a smart phone or tablet) 716, a display 712, and a computer 714.

The network 700 may be any type of information distribution network, such as satellite, telephone, cellular, wireless, etc. One example may be an optical fiber network, a coaxial cable network, or a hybrid fiber/coax distribution network. Such networks 700 use a series of interconnected communication links 701 (e.g., coaxial cables, optical fibers, wireless, etc.) to connect multiple premises 702 (e.g., businesses, homes, consumer dwellings, etc.) to a local office or local office 703. The local office 703 may send downstream information signals via the links 701, and each premises 702 may have a receiver used to receive and process those signals.

There may be one link 701 originating from a local office 703, and it may be split a number of times to distribute the signal to various premises 702 in the vicinity (which may be many miles) of the local office 703. The links 701 may include components not shown, such as splitters, filters, amplifiers, etc. to help convey the signal clearly. Portions of the links 701 may also be implemented with fiber-optic cable, while other portions may be implemented with coaxial cable, other lines, or wireless communication paths.

The local office 703 may include an interface, such as a termination system (TS) 704. More specifically, the interface 704 may be a cable modem termination system (CMTS), which may be one or more computing devices configured to manage communications between devices on the network of links 701 and backend devices such as the servers 705-707. The interface 704 may be as specified in a standard, such as the Data Over Cable Service Interface Specification ("DOCSIS") standard, published by Cable Television Laboratories, Inc. (a.k.a. CableLabs), or it may be a similar or modified device instead. The interface 704 may be configured to place data on one or more downstream frequencies to be received by modems at the various premises 702, and to receive upstream communications from those modems on one or more upstream frequencies.

The local office 703 may also include one or more interfaces 708, which can permit the local office 703 to communicate with various other external networks 709. These networks 709 may include, for example, networks of Internet devices, telephone networks, cellular telephone networks, fiber optic networks, local wireless networks (e.g., WiMAX), satellite networks, and any other desired network, and the network interface 708 may include the corresponding circuitry needed to communicate on the external networks 709, and to other devices on the network such as a cellular telephone network and its corresponding cell phones.

The local office 703 may include a variety of servers 705-703 that may be configured to perform various functions. For example, the local office 703 may include a push notification server 705. The push notification server 705 may generate push notifications to deliver data and/or commands to the various premises 702 in the network (e.g., to the devices in the premises 702 that are configured to detect such notifications). The local office 703 may also include a content server 706. The content server 706 may be one or more computing devices that are configured to provide content to users at their premises. This content may be, for example, video on demand movies, television programs, songs, text listings, etc. The content server 706 may include software to validate user identities and entitlements, to locate and retrieve requested content, to encrypt the content, and to initiate delivery (e.g., streaming) of the content to the requesting user(s) and/or device(s).

The local office 703 may also include one or more application servers 707. An application server 707 may be one or more computing devices configured to offer any desired service, and may run various languages and operating systems. For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 702. Although shown separately, the push server 705, content server 706, and application server 707 may be combined. Although the push server 705, content server 706, and application server 707 are shown generally, and it will be understood that they may each contain memory storing computer executable instructions to cause a processor to perform steps described herein and/or memory for storing data. Alternate and/or additional servers may be included in local office 703 or elsewhere in the network 700.

The example premises 702*a*, such as a home, may include an interface 720. Although only one interface is shown in FIG. 7, a plurality of interfaces may be implemented. The interface 720 can include any communication circuitry needed to allow a device to communicate on one or more links 701 with other devices in the network. For example, the interface 720 may include a modem 710, which may include transmitters and receivers used to communicate on the links 701 and with the local office 703. The modem 710 may be, for example, a coaxial cable modem (for coaxial cable lines 701), a fiber interface node (for fiber optic lines 701), twisted-pair telephone modem, cellular telephone transceiver, satellite transceiver, local WiFi router or access point, or any other desired modem device. Also, although only one modem is shown in FIG. 7, a plurality of modems operating in parallel may be implemented within the interface 720. Further, the interface 720 may include a gateway interface device 711. The modem 710 may be connected to, or be a part of, the gateway interface device 711. The gateway interface device 711 may be one or more computing devices that communicate with the modem(s) 710 to allow one or more other devices in the premises 702*a*, to communicate with the local office 703 and other devices beyond the local office 703. The gateway 711 may comprise a set-top box (STB), digital video recorder ("DVR"), computer server, or any other desired computing device. The gateway 711 may also include (not shown) local network interfaces to provide communication signals to requesting entities/devices in the premises 702*a*, such as display devices 712 (e.g., televisions), additional STBs or DVRs 713, personal computers 714, laptop computers 715, wireless devices 716 (e.g., wireless routers, wireless laptops, notebooks, tablets and netbooks, cordless phones (e.g., Digital Enhanced Cordless Telephone-DECT phones), mobile phones, mobile televisions, personal digital assistants ("PDA"), etc.), landline phones 717 (e.g., Voice over Internet Protocol-VoIP phones), and any other desired devices. Examples of the local network interfaces include Multimedia Over Coax Alliance ("MoCA") interfaces, Ethernet interfaces, universal serial bus ("USB") interfaces, wireless interfaces (e.g., IEEE 802.11, IEEE 802.15), analog twisted pair interfaces, Bluetooth interfaces, and others.

Figure 8:
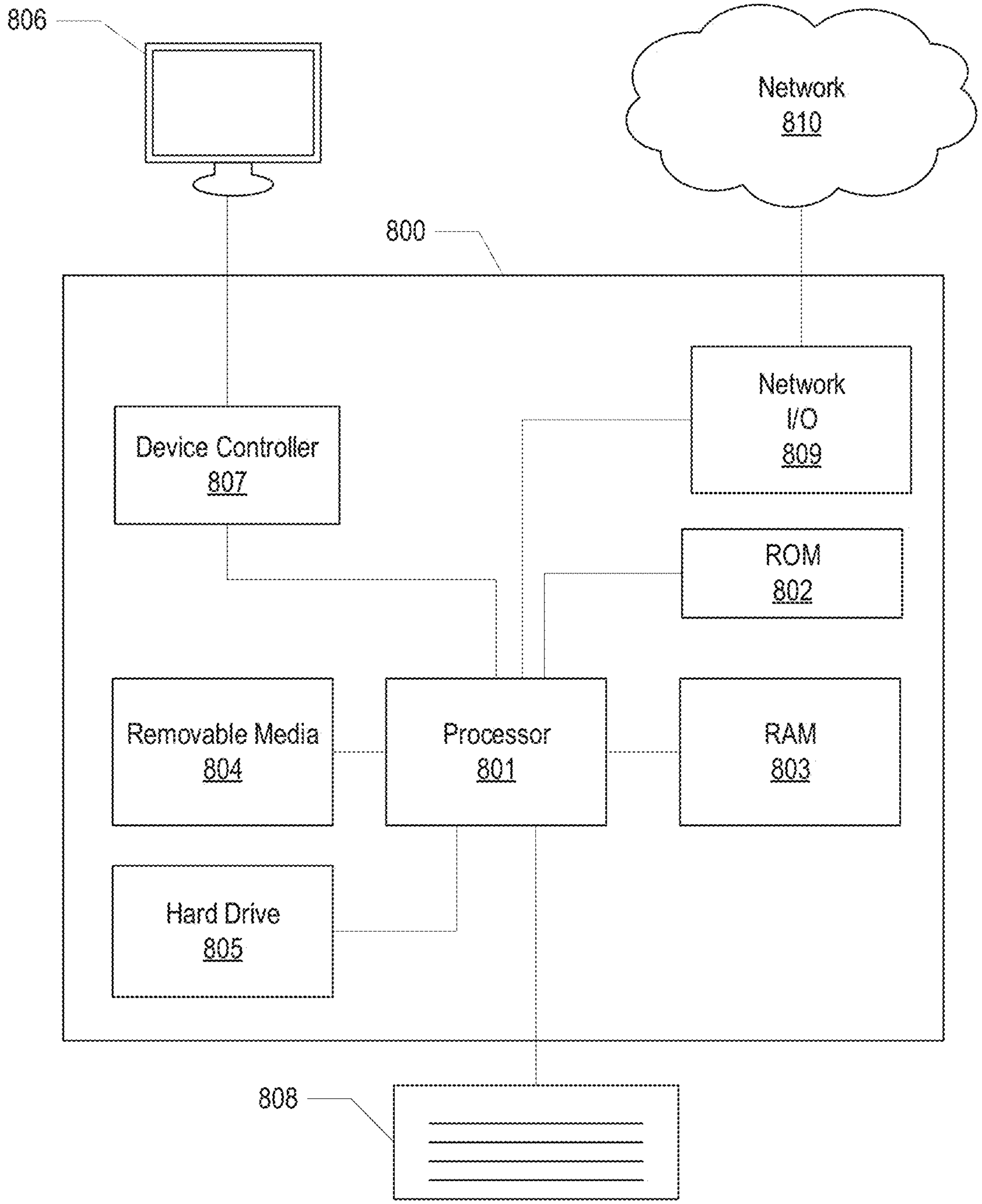
FIG. 8 shows hardware elements of an example computing device.

FIG. 8 is a block diagram showing hardware elements of an example computing device 800, such as computing device 201.

The computing device 800 may include one or more processors 801, which may execute instructions of a computer program to perform any of the features described herein. The instructions may be stored in any type of computer-readable medium or memory, to configure the operation of the processor 801. For example, instructions may be stored in a read-only memory ("ROM") 802, a random access memory ("RAM") 803, a removable media 804, such as a Universal Serial Bus ("USB") drive, compact disk ("CD") or digital versatile disk ("DVD"), a floppy disk drive, or any other desired storage medium. Instructions may also be stored in an attached (or internal) hard drive 805. The computing device 800 may include one or more output devices, such as a display 806 (e.g., an external television), and may include one or more output device controllers 807, such as a video processor. There may also be one or more user input devices 808, such as a remote control, keyboard, mouse, touch screen, microphone, camera input for user gestures, etc. The computing device 800 may also include one or more network interfaces, such as a network input/output (I/O) circuit 809 (e.g., a network card) to communicate with an external network 810. The network input/output circuit 809 may be a wired interface, wireless interface, or a combination of the two. The network input/output circuit 809 may include a modem (e.g., a cable modem), and the external network 810 may include the communication links 701 discussed above, the external network 709, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 811, which can be configured to receive and process global positioning signals and determine, with possible assistance from an external server and antenna, a geographic position of the device.

The FIG. 8 example is a hardware configuration, although the components may be wholly or partially implemented as software as well. Modifications may be made to add, remove, combine, divide, etc. components of the computing device 800 as desired. Additionally, the components may be implemented using basic computing devices and components, and the same components (e.g., processor 801, ROM storage 802, display 806, etc.) may be used to implement any of the other computing devices and components described herein. For example, the various components herein may be implemented using computing devices having components such as a processor executing computer-executable instructions stored on a computer-readable medium, as shown in FIG. 8. Some or all of the entities described herein may be software based, and may co-exist in a common physical platform (e.g., a requesting entity can be a separate software process and program from a dependent entity, both of which may be executed as software on a common computing device).

One or more features may be embodied in a computer-usable data and/or computer-executable instructions, such as in one or more program modules, executed by one or more computers or other devices. Program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed. In addition, the functionality may be embodied in whole or in part in firmware or hardware equivalents such as integrated circuits and/or field programmable gate arrays ("FPGA"). Particular data structures may be used to more effectively implement one or more features of the disclosure, and such data structures are contemplated within the scope of computer executable instructions and computer-usable data described herein.

Features of the disclosure have been described in terms of examples. While example systems, apparatuses, and methods embodying various features of the present disclosure are shown, it will be understood that the disclosure is not limited to these examples or features. Modifications may be made. Each of the features of the aforementioned examples may be utilized alone or in combination or sub-combination with elements of other examples. Any of the above described systems and methods or parts thereof may be combined with the other methods and systems or parts thereof described above. The steps shown in the figures may be performed in other than the recited order, and one or more steps shown may be optional. These and other modifications may be made without departing from the spirit and scope of the present disclosure. The description and drawings are thus to be regarded as examples instead of restrictive on the present disclosure.

What is claimed is:

1. A method comprising:

receiving, by a computing device, information indicating:
  a portion of content, and
  an importance associated with the portion of the content; and
based on a determination that the importance associated with the portion of the content satisfies a threshold, using enhancement data to output the portion of the content.

2. The method of claim 1, further comprising:

determining the threshold based on one or more of:
  a subscription level of a user account,
  a content type of the content,
  audio capabilities of an audio device,
  capabilities of a display device,
  data transmission costs associated with an interface,
  a genre of the content, or
  network conditions.

3. The method of claim 1, wherein the enhancement data is configured to enhance one or more of:

a dynamic range of the portion of the content, or
audio of the content.

4. The method of claim 1, further comprising:

receiving, via a first interface, the portion of the content, wherein the threshold is based on the first interface; and
receiving, via a second interface different from the first interface, the enhancement data.

5. The method of claim 1, further comprising:

determining, based on an interface, a second threshold; and
receiving, via the interface and based on a second comparison of the importance associated with the portion of the content to the second threshold, the enhancement data.

6. The method of claim 1, wherein the importance associated with the portion of the content is based on one or more of:

a device type of the computing device, or
a device type of an associated display device.

7. The method of claim 1, wherein the information further indicates a plurality of importance values associated with the portion of the content corresponding to different service levels.

8. The method of claim 1, wherein the importance associated with the portion of the content comprises one or more of:

an importance of the portion, and
an importance of the enhancement data associated with the portion.

9. The method of claim 1, further comprising:

selecting one or more interfaces to receive the portion of the content, wherein the selecting is based on one or more of:
  a scene complexity associated with the portion of the content,
  the importance associated with the portion of the content,
  a minimum bandwidth requirement,
  a tolerance for latency delays,
  current network congestion,
  time period, a user associated with a request to display the portion of the content, a file size associated with the portion of the content, or a duration associated with the portion of the content.

10. The method of claim 1, wherein the content comprises one or more of:

a basic baseline version of the content, an advanced baseline version of the content, a 480p version of the content, a 720p version of the content, a 1080p version of the content, an HD version of the content, or a 4K version of the content.

11. A computing device comprising:

one or more processors; and memory storing instructions that, when executed by the one or more processors, cause the computing device to:

receive information indicating:

a portion of content, and an importance associated with the portion of the content; and based on a determination that the importance associated with the portion of the content satisfies a threshold, use enhancement data to output the portion of the content.

12. The computing device of claim 11, wherein the instructions, when executed by the one or more processors, further cause the computing device to:

determine the threshold based on one or more of:

a subscription level of a user account, a content type of the content, audio capabilities of an audio device, capabilities of a display device, data transmission costs associated with an interface, a genre of the content, or network conditions.

13. The computing device of claim 11, wherein the enhancement data is configured to enhance one or more of:

a dynamic range of the portion of the content, or audio of the content.

14. The computing device of claim 11, wherein the instructions, when executed by the one or more processors, further cause the computing device to:

receive, via a first interface, the portion of the content, wherein the threshold is based on the first interface; and receive, via a second interface different from the first interface, the enhancement data.

15. The computing device of claim 11, wherein the instructions, when executed by the one or more processors, further cause the computing device to:

determine, based on an interface, a second threshold; and receive, via the interface and based on a second comparison of the importance associated with the portion of the content to the second threshold, the enhancement data.

16. The computing device of claim 11, wherein the importance associated with the portion of the content is based on one or more of:

a device type of the computing device, or a device type of an associated display device.

17. The computing device of claim 11, wherein the information further indicates a plurality of importance values associated with the portion of the content corresponding to different service levels.

18. The computing device of claim 11, wherein the importance associated with the portion of the content comprises one or more of:

an importance of the portion, and an importance of the enhancement data associated with the portion.

19. The computing device of claim 11, wherein the instructions, when executed by the one or more processors, further cause the computing device to:

select one or more interfaces to receive the portion of the content, wherein the selecting is based on one or more of:

a scene complexity associated with the portion of the content, the importance associated with the portion of the content, a minimum bandwidth requirement, a tolerance for latency delays, current network congestion, time period, a user associated with a request to display the portion of the content, a file size associated with the portion of the content, or a duration associated with the portion of the content.

20. The computing device of claim 11, wherein the content comprises one or more of:

a basic baseline version of the content, an advanced baseline version of the content, a 480p version of the content, a 720p version of the content, a 1080p version of the content, an HD version of the content, or a 4K version of the content.

21. One or more non-transitory computer-readable media storing instructions that, when executed, cause:

receiving, by a computing device, information indicating:

a portion of content, and an importance associated with the portion of the content; and based on a determination that the importance associated with the portion of the content satisfies a threshold, using enhancement data to output of the portion of the content.

22. The one or more non-transitory computer-readable media of claim 21, wherein the instructions, when executed, further cause:

determining the threshold based on one or more of:

a subscription level of a user account, a content type of the content, audio capabilities of an audio device, capabilities of a display device, data transmission costs associated with an interface, a genre of the content, or network conditions.

23. The one or more non-transitory computer-readable media of claim 21, wherein the enhancement data is configured to enhance one or more of:

a dynamic range of the portion of the content, or audio of the content.

24. The one or more non-transitory computer-readable media of claim 21, wherein the importance associated with the portion of the content is based on one or more of:

a device type of the computing device, or a device type of an associated display device.

25. The one or more non-transitory computer-readable media of claim 21, wherein the information further indicates a plurality of importance values associated with the portion of the content corresponding to different service levels.

26. The one or more non-transitory computer-readable media of claim 21, wherein the importance associated with the portion of the content comprises one or more of:

an importance of the portion, and an importance of the enhancement data associated with the portion.

27. The one or more non-transitory computer-readable media of claim 21, wherein the instructions, when executed, further cause:

selecting one or more interfaces to receive the portion of the content, wherein the selecting is based on one or more of:

a scene complexity associated with the portion of the content, the importance associated with the portion of the content, a minimum bandwidth requirement, a tolerance for latency delays, current network congestion, time period, a user associated with a request to display the portion of the content, a file size associated with the portion of the content, or a duration associated with the portion of the content.

28. The one or more non-transitory computer-readable media of claim 21, wherein the content comprises one or more of:

a basic baseline version of the content, an advanced baseline version of the content, a 480p version of the content, a 720p version of the content, a 1080p version of the content, an HD version of the content, or a 4K version of the content.

29. A system comprising:

a computing device; and a display device, wherein the computing device is configured to:

receive information indicating:

a portion of content, and an importance associated with the portion of the content; and based on a determination that the importance associated with the portion of the content satisfies a threshold, use enhancement data to output of the portion of the content, and wherein the display device is configured to:

output the portion of the content.

30. The system of claim 29, wherein the computing device is further configured to determine the threshold based on one or more of:

a subscription level of a user account, a content type of the content, audio capabilities of an audio device, capabilities of the display device, data transmission costs associated with an interface, a genre of the content, or network conditions.

31. The system of claim 29, wherein the enhancement data is configured to enhance one or more of:

a dynamic range of the portion of the content, or audio of the content.

32. The system of claim 29, wherein the importance associated with the portion of the content is based on one or more of:

a device type of the computing device, or a device type of the display device.

33. The system of claim 29, wherein the information further indicates a plurality of importance values associated with the portion of the content corresponding to different service levels.

34. The system of claim 29, wherein the importance associated with the portion of the content comprises one or more of:

an importance of the portion, and an importance of the enhancement data associated with the portion.

35. The system of claim 29, wherein the computing device is further configured to:

select one or more interfaces to receive the portion of the content, wherein the selecting is based on one or more of:

a scene complexity associated with the portion of the content, the importance associated with the portion of the content, a minimum bandwidth requirement, a tolerance for latency delays, current network congestion, time period, a user associated with a request to display the portion of the content, a file size associated with the portion of the content, or a duration associated with the portion of the content.

36. The system of claim 29, wherein the content comprises one or more of:

a basic baseline version of the content, an advanced baseline version of the content, a 480p version of the content, a 720p version of the content, a 1080p version of the content, an HD version of the content, or a 4K version of the content.

* * * * *